(12) United States Patent
Acosta-Serafini et al.

(10) Patent No.: US 6,977,685 B1
(45) Date of Patent: Dec. 20, 2005

(54) SINGLE-CHIP IMAGER SYSTEM WITH PROGRAMMABLE DYNAMIC RANGE

(75) Inventors: Pablo M. Acosta-Serafini, Arlington, MA (US); Ichiro Masaki, Boxborough, MA (US); Charles G. Sodini, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/512,954

(22) Filed: Feb. 25, 2000

Related U.S. Application Data

(60) Provisional application No. 60/121,845, filed on Feb. 26, 1999.

(51) Int. Cl.[7] .......................... H04N 5/335; H04N 3/14
(52) U.S. Cl. ...................................... 348/308; 297/302
(58) Field of Search ................................ 348/297, 296, 348/294, 299, 308, 302, 314; 250/208.1

(56) References Cited

U.S. PATENT DOCUMENTS

| 4,706,123 | A |   | 11/1987 | Chautemps |
|---|---|---|---|---|
| 4,797,562 | A |   | 1/1989 | Dietrich |
| 4,984,002 | A |   | 1/1991 | Kukubo |
| 5,021,888 | A |   | 6/1991 | Kondou et al. |
| 5,097,305 | A |   | 3/1992 | Mead et al. |
| 5,117,292 | A |   | 5/1992 | Matsunaga |
| 5,157,502 | A |   | 10/1992 | Nakajima et al. |
| 5,233,428 | A |   | 8/1993 | Alford et al. |
| 5,262,871 | A | * | 11/1993 | Wilder et al. ............... 348/307 |
| 5,398,123 | A | * | 3/1995 | Katsuma ..................... 358/518 |
| 5,541,654 | A | * | 7/1996 | Roberts ....................... 348/301 |
| 5,579,049 | A |   | 11/1996 | Shimaya et al. |

(Continued)

FOREIGN PATENT DOCUMENTS

WO   WO 98/14002   4/1998

(Continued)

OTHER PUBLICATIONS

Wilson et al., Versatile Multi Mode 320×240/256×256 Hybrid InSb Infrared Focal Plane Array With Selectable Snapshot or Rolling Integration, SPIE vol. 1762, "Infrared Technology XVIII," pp. 401-405, 1992.

(Continued)

Primary Examiner—James J. Groody
Assistant Examiner—Lin Ye
(74) Attorney, Agent, or Firm—Theresa A. Lober

(57) ABSTRACT

The imager system of the invention, provided in a semiconductor substrate, includes a plurality of photosensitive, charge integrating pixels that are arranged in rows and columns of a pixel array for capturing illumination of a scene to be imaged. Each pixel includes a photogenerated charge accumulation region of the semiconductor substrate and a sense node at which an electrical signal, indicative of pixel charge accumulation, can be measured without discharging the accumulation region. Pixel access control circuitry is connected to pixel array rows and columns to deliver pixel access signals generated by the access control circuitry for independently accessing a selected pixel in the array. An input interface circuit is connected to accept a dynamic range specification input for the array pixels. Integration control circuitry is connected to access a selected pixel of the array to read the sense node electrical signal of the selected pixel, and configured to generate pixel-specific integration control signals delivered to the selected pixel, independent of other pixels, based on dynamic range specification input provided by the input interface circuit. An output interface circuit is connected to the pixel array to produce output image data based on sense node electrical signals from the pixel array.

23 Claims, 15 Drawing Sheets

U.S. PATENT DOCUMENTS

| | | | |
|---|---|---|---|
| 5,587,738 A * | 12/1996 | Shinohara | 348/302 |
| 5,659,359 A | 8/1997 | Mochizuki et al. | |
| 5,665,959 A | 9/1997 | Fossum et al. | |
| 5,872,596 A * | 2/1999 | Yanai et al. | 348/297 |
| 5,883,830 A * | 3/1999 | Hirt et al. | 365/185.03 |
| 5,889,883 A * | 3/1999 | Simpkins | 382/135 |
| 6,101,294 A * | 8/2000 | McCaffrey et al. | 382/312 |
| 6,175,383 B1 * | 1/2001 | Yadid-Pecht et al. | 348/302 |
| 6,255,638 B1 * | 7/2001 | Eraluoto et al. | 250/208.1 |
| 6,452,632 B1 * | 9/2002 | Umeda et al. | 348/294 |
| 6,552,746 B1 * | 4/2003 | Yang et al. | 348/308 |
| 6,573,936 B2 * | 6/2003 | Morris et al. | 348/294 |
| 6,580,454 B1 * | 6/2003 | Perner et al. | 348/302 |
| 6,606,121 B1 | 8/2003 | Bohm et al. | |
| 6,614,560 B1 * | 9/2003 | Silverbrook | 358/443 |
| 2002/0101528 A1 * | 8/2002 | Lee et al. | 348/304 |

FOREIGN PATENT DOCUMENTS

| | | |
|---|---|---|
| WO | WO 97/17800 | 5/1999 |

OTHER PUBLICATIONS

Vangorden et al., "SICam—A PC Compatiible Digital Instrumentation Camera Incorporating A Large Pixel 512×512 Format Charge Injection Device (CID)," SPIE vol. 1901, "Cameras, Scanners, and Image Acquisition Systems," pp. 83-98, 1993.

Vellacott, "CMOS in camera," IEE Review, pp. 111-114, May 1994.

Wentink et al., "Charge injection device (CID) technology—a solution for photon and particle imaging applications," Nuclear instruments and Methods in Physics Research A, vol. 347, pp. 522-528, 1994.

Chen et al., "Adaptive Sensitivity CCD Imager," SPIE vol. 2415: "Charge-Coupled Devices and Solid State Optical Sensors V," pp. 303-309, Feb. 1995.

Seitz, "From Electronic Photography to Seeing Chips—The Future of Image Sensing" IEEE AT'95: "Advanced Technologies Intelligent Vision," pp. 3-9, Oct. 1995.

Colchester et al., "Towards the Limits of Frame Transfer CCDs in Beam Instrumentation," AIP Conference Proceedings: "Beam Instrumentation," Seventh Workshop, pp. 215-222, May 1996.

Zarnowski et al., "Scientific CMOS CID Imagers," SPIE vol. 2654, pp. 29-37, 1996.

Chen et al., "An Adaptive Sensitivity TDI CCD Sensor," SPIE vol. 2950, pp. 45-48, 1996.

Shimamoto et al., "A dynamic range expansion method for a CMD Imager," SPIE vol. 3019, pp. 249-255, 1997.

Yadid-Pecht et al., "Wide Intrascene Dynamic Range CMOS APS Using Dual Sampling," IEEE Transactions on Electron Devices, vol. 44, No. 10, pp. 1721-1723, Oct. 1997.

Yadid-Pecht et al., "CMOS Active Pixel Sensor Star Tracker with Regional Electronic Shutter," IEEE Journal of Solid-State Circuits, vol. 32, No. 2, pp. 285-288, Feb. 1997.

McGrath et al., "Current-Mediated, Current-Reset 768×512 Active Pixel Sensor Array," 1997 IEEE Int. Solid-State Circuits Conference, Session 11, Paper Fa 11.2, pp. 182-183, 1997.

Fischer et al., "A counting pixel readout chip for imaging applications," Nuclear Instruments and Methods in Physics Research A, vol. 405, pp. 53-39, 1998.

Hoekstra et al., "A memory read-out approach for a 0.5 micron CMOS image sensor," SPIE vol. 3301, pp. 151-157, 1998.

Yadid-Pecht et al., "Wide-dynamic-range sensors," Optical Engineering, vol. 38, No. 10, pp. 1650-1660, Oct. 1999.

Yang et al., "A 640×512 CMOS Image Sensor with Ultrawide Dynamic Range Floating-Point Pixel-Level ADC, " IEEE Journal of Solid-State Circuits, vol. 34, No. 12, pp. 1821-1834, Dec. 1999.

* cited by examiner

X - Pixel 1
O - Pixel 2
□ Pixel 3
△ Pixel 4

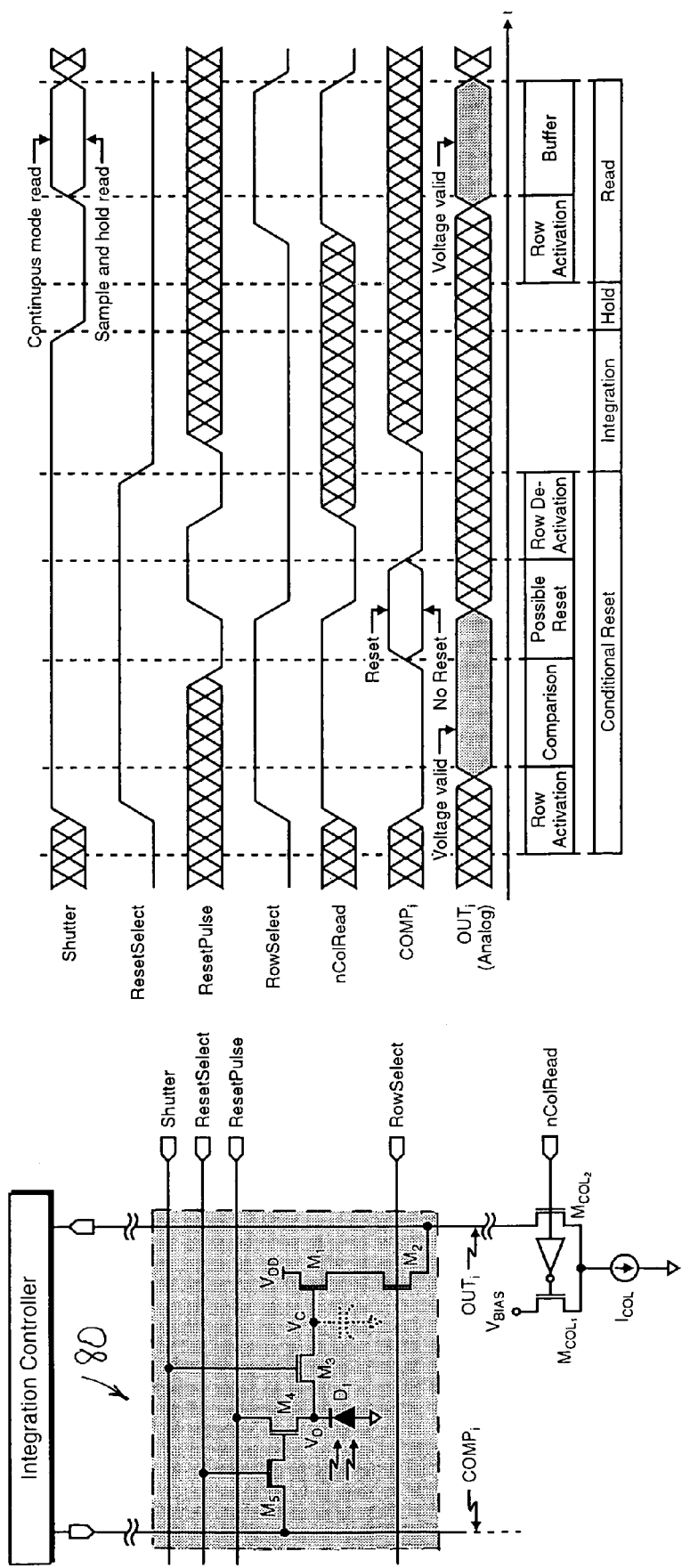

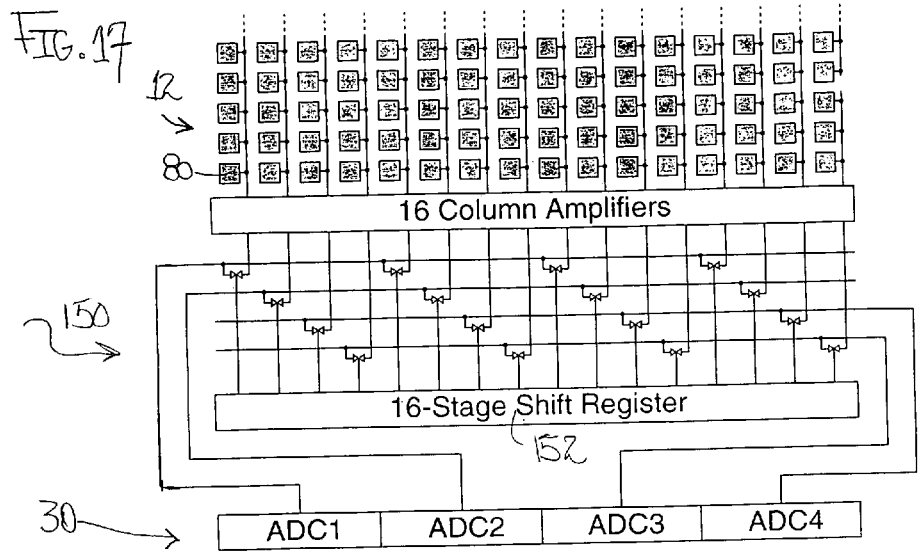
FIG. 17
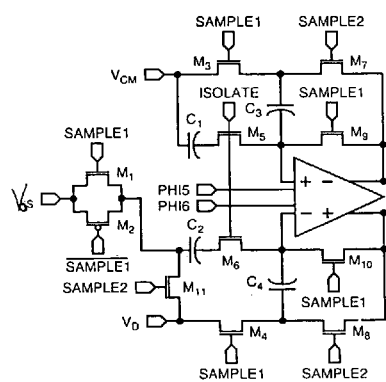
FIG. 18A
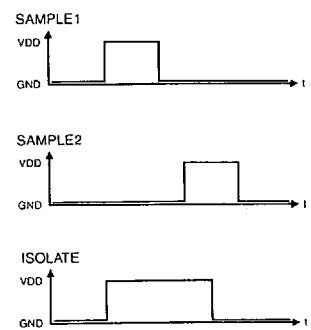
FIG. 18B
FIG. 18C
FIG. 18D
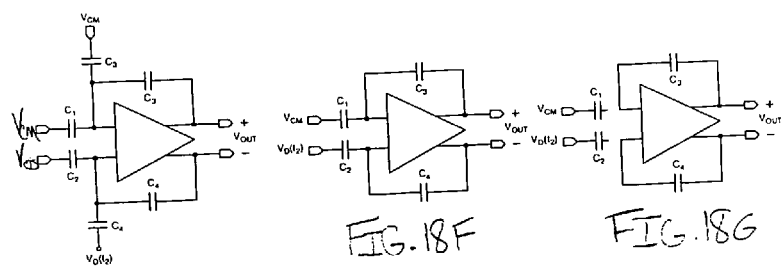
FIG. 18E   FIG. 18F   FIG. 18G

SINGLE-CHIP IMAGER SYSTEM WITH PROGRAMMABLE DYNAMIC RANGE

This application claims the benefit of U.S. Provisional Application No. 60/121,845, filed Feb. 26, 1999, the entirety of which is incorporated by reference.

This invention was made with funds from the U.S. government under contract No. MIP-9423221 administered by the National Science Foundation. The government has certain rights in the invention.

BACKGROUND OF THE INVENTION

This invention relates to image sensors and more particularly relates to methods for controlling the dynamic range of an image sensor.

CMOS image sensors are increasingly becoming the preferable selection over CCD image sensors for a wide range of solid-state imaging applications. This is particularly true for those applications that demand the inherent advantages of CMOS fabrication such as low cost, small feature size production, and large-scale monolithic integration. But because the illumination range, or dynamic range, characteristic of CCD image sensors is generally larger than that of CMOS image sensors, for many applications CMOS image sensor performance is suboptimal to CCD image sensor performance. The reduced dynamic range of CMOS imagers is generally due to a readout noise level that is higher than that of CCD imagers. This performance limitation of CMOS imagers results in a required trade-off between operational and functional features together desired of an image sensor for a given application.

For many challenging applications like machine vision applications, the combined performance, operational, and functional capabilities of CCD and CMOS image sensors are desired, however. Specifically, the low cost and small size that can be achieved for a typical CMOS imager is often desired in combination with the performance advantages of a CCD imager. In a typical machine vision application, high illumination resolution is required, to enable object comparison based on object surface characteristics such as texture, color, or orientation, all of which may be manifested as subtle changes in light intensity distribution. High spatial resolution is also required, to enable a sufficiently wide field of view and to enable high precision of image processing tasks such as edge detection, median filtering, smoothing, and segmentation. Image sensing capability at a high frame rate is often required to avoid loss of visual information, especially for applications such as intelligent transportation systems where the imager or the environment to be imaged may be moving at high speed. A short image integration time is also here desired for minimization of captured image blurriness caused by mechanical vibrations of the moving sensor.

A particularly stringent requirement for many machine vision applications is a wide illumination dynamic range. Such is typically required to enable effective imaging of natural scenes; a naturally lit scene may have a dynamic range that is four orders of magnitude or more. For applications such as vehicle-based imaging systems that inherently have no control over natural or artificial light in a scene to be imaged, the dynamic range of an imager can be the limiting performance characteristic of the imager.

There have been made many diverse proposals for enabling an increase in the dynamic range of an image sensor in general. Such proposals range from changes in design of the photodiodes employed in imager pixels, to modifications in the conversion gain of imager pixels, to pixel-level circuit configurations, to customized system-level architecture and control configurations. In general such techniques are found to provide an inadequate degree of dynamic range expansion, to require a tradeoff with spatial resolution, frame rate, size, cost or other image sensor consideration, or to impose excessive operational requirements. As a result, the multifaceted demands of many imager applications have generally not been fully addressed in a single imager system.

SUMMARY OF THE INVENTION

The invention overcomes the limitations of prior imaging systems to provide an imager system having a wide and user-programmable dynamic range in a single-chip system implementation. Acquired image frame rate, pixel integration time, and digitization precision, among other parameters, are user programmable along with dynamic range.

The imager system, provided in a semiconductor substrate, includes a plurality of photosensitive, charge integrating pixels that are arranged in rows and columns of a pixel array for capturing illumination of a scene to be imaged. Each pixel includes a photogenerated charge accumulation region of the semiconductor substrate and a sense node at which an electrical signal, indicative of pixel charge accumulation, can be measured without discharging the accumulation region. The system provides pixel access control circuitry that is connected to pixel array rows and columns to deliver pixel access signals generated by the access control circuitry for independently accessing a selected pixel in the array. An input interface circuit is connected to accept a dynamic range specification input for the array pixels. Integration control circuitry is connected to access a selected pixel of the array to read the sense node electrical signal of the selected pixel, and configured to generate pixel-specific integration control signals delivered to the selected pixel, independent of other pixels, based on dynamic range specification input provided by the input interface circuit. An output interface circuit is connected to the pixel array to produce output image data based on sense node electrical signals from the pixel array.

With this configuration, the imager system of the invention provides the ability to monolithically integrate user-programmable pixel array control with the pixel array itself. This integration minimizes generation of noise in pixel value processing and maximizes imager system signal processing speed. As a result, the single-chip imager system of the invention enables an increase in pixel dynamic range that cannot be achieved by multi-chip imager systems.

In example embodiments provided by the invention, the pixel sense node electrical signal can consist of a voltage signal; the pixel can here consist of a CMOS pixel. The integration control signals generated by the integration controller can be pixel-specific charge accumulation reset signals.

An array of memory cells can be included with the imager system. Each memory cell in the array corresponds to a specified pixel in the pixel array. With this correspondence, each memory cell is connected to store from the integration controller of the system an indication of the number of reset occurrences of the specified pixel during a given imager integration period. In a preferred embodiment, the memory cell array is configured spatially separate from the pixel array.

The output interface circuit can include an image data formatter that is configured to generate output image data based on sense node electrical signals from the pixel array and corresponding reset occurrence data from the memory cell array. The output interface circuit further can include a correlated double-sampling circuit that is configured to convert sense node electrical signals from the pixel array from single-ended to differential output, and to remove the pixel reset level from the sense node electrical signals. An analog-to-digital converter ADC can be provided as part of the output interface to digitize sense node electrical signals from the pixel array. In one embodiment, the ADC consists of an array of ADCs; here a multiplexer is connected between the pixel array and the ADC array for directing a selected sense node electrical signal from the pixel array to a selected converter in the array of converters.

The input interface circuit can be connected to accept a specification of a sub-array of pixels to be controlled in the pixel array; here the integration control circuitry of the system is connected to independently access a selected pixel in the sub-array of pixels. The input interface circuit can be further connected to accept a specification of a number of pixels to be controlled in the pixel array; here the integration control circuitry of the system is connected to independently access a selected pixel in the number of pixels specified. The input interface circuit can also be connected to accept a specification of a frame rate at which images of a scene are to be produced. The integration control circuitry is configured in this scenario to impose on the pixel array an imager integration period based on the frame rate specification. Sense node electrical signal digitization resolution can further be accepted by the input interface circuit. The image data formatter of the output interface circuit is configured to generate digitized output image data based on the digitization resolution specification and the sense node electrical signals.

In example embodiments, the integration controller consists of a comparator circuit corresponding to each column of the pixel array. Each comparator circuit is connected to compare a sense node electrical signal of a pixel selected from the corresponding array column with a reference electrical signal that is generated based on the dynamic range specification input. This results in the production of a comparator output signal that is determinative of reset timing of the selected pixel. The integration controller can be configured to generate integration control signals for a selected pixel based on output signals from a corresponding comparator, to permit integration of the selected pixel during at least one of a plurality of integration slots. The integration slots are of successively shorter durations, and all integration slots have a common end time. The integration slot durations are defined for a given imager integration period based on the dynamic range specification input. In one example, at least three integration slots are provided. The dynamic range specification input accepted by the interface circuit can consist of a duration ratio between successively started integration slots for a given imager integration period.

The invention also provides a method for controlling charge integration of a plurality of photosensitive, charge integrating pixels of a pixel array for capturing illumination of a scene to be imaged during an integration period. Each pixel is specified to include a photogenerated charge accumulation region and a sense node at which an electrical signal, indicative of pixel charge accumulation, can be measured without discharging the accumulation region. The method provides the following steps:

(A) providing a plurality of integration slots for the integration period, with all integration slots ending with integration period end, a first integration slot beginning with integration period start, and each integration slot following the first slot being of successively shorter duration;

(B) initiating charge integration of each pixel in the pixel array for the integration period and the first integration slot;

(C) for any current integration slot except a last integration slot, at an intermediate time during the current integration slot, evaluating the sense node electrical signal of each pixel for which the current integration slot was initiated to determine if that pixel will saturate during the current integration slot. The saturation evaluation is based on the electrical signal range characteristic of that pixel and on the ratio of duration of a next succeeding integration slot to duration of the current integration slot;

(D) resetting any pixel for which the integration evaluation indicates pixel saturation during the current integration slot;

(E) permitting continued integration to the end of the current integration slot of any pixel for which the integration evaluation does not indicate saturation during the current integration slot, and initiating a next succeeding integration slot for any reset pixel;

(F) repeating steps (C) to (E) until the end of the integration period and the last integration slot is reached; and (G) producing output image data for each pixel based on sense node electrical signals from that pixel and an indication of number of integration slots for which that pixel was initiated during the integration period.

In an example embodiment, the pixel saturation evaluation step of this method is carried out as a comparison of pixel sense node voltage to a check voltage, $V_{CHECK(i)}$, for the $i^{th}$ integration slot, given as:

$$V_{CHECK(i)} = V_{RESET} - \Delta V_D \cdot \left(1 - \frac{T_{INT(i+1)}}{T_{INT(i)}}\right),$$

for electron integration and $$V_{CHECK(i)} = V_{RESET} + \Delta V_D \cdot \left(1 - \frac{T_{INT(i+1)}}{T_{INT(i)}}\right),$$

for hole integration, where $V_{RESET}$ is a characteristic pixel reset voltage, $\Delta V_D$ is a voltage range characteristic of the pixel, $T_{INT(i+1)}$ is the duration of the next succeeding integration slot, and $T_{INT(i)}$ is the duration of the current integration slot.

In the method, data that is stored in an array of memory cells provided in a one-to-one correspondence with the array of pixels can be updated to reflect the number of times that a corresponding pixel was reset during the integration period. The memory cell data can thereby be employed as the indication of the number of integration slots for which a pixel was initiated during the integration period.

The integration slots provided for the integration period can be provided with a first integration slot of maximum duration, $T_{INT,MAX}$, and a last integration slot of minimum duration, $T_{INT,MIN}$, which are determined based on an input dynamic range increase specification, K, as $$K = \frac{T_{INT,MAX}}{T_{INT,MIN}}.$$

The integration control method and the imager system provided by the invention can be adapted for a wide range of imager applications and configurations, including machine vision and scientific applications such as automotive and astronomy applications, as well as consumer applications such as camcorder and still camera products. The imager system can be produced cost-effectively and with elegantly simple input/output connections. User-programmability enables real time flexibility that accommodates the demands of many applications.

Other applications, features, and advantages of the invention will be apparent from the following description and associated drawings, and from the claims.

BRIEF DESCRIPTION OF THE DRAWINGS

FIG. 9A is a circuit diagram of a preferred pixel configuration provided by the invention;

FIG. 9B is a timing diagram for the timing signals employed in operation of the pixel of FIG. 9A;

FIG. 17 is a circuit diagram of the imager system variable-to-fixed analog multiplexer provided by the invention;

FIG. 18A is a circuit diagram of the imager system correlated double sampler provided by the invention;

FIGS. 18B–D are timing diagrams of the signals employed in operating the correlated double sampler of FIG. 18A;

FIGS. 18E–G are circuit diagrams of operational configurations of the correlated double sampler of FIG. 18A at intermediate operational stages;

DETAILED DESCRIPTION OF THE INVENTION

Figure 1:
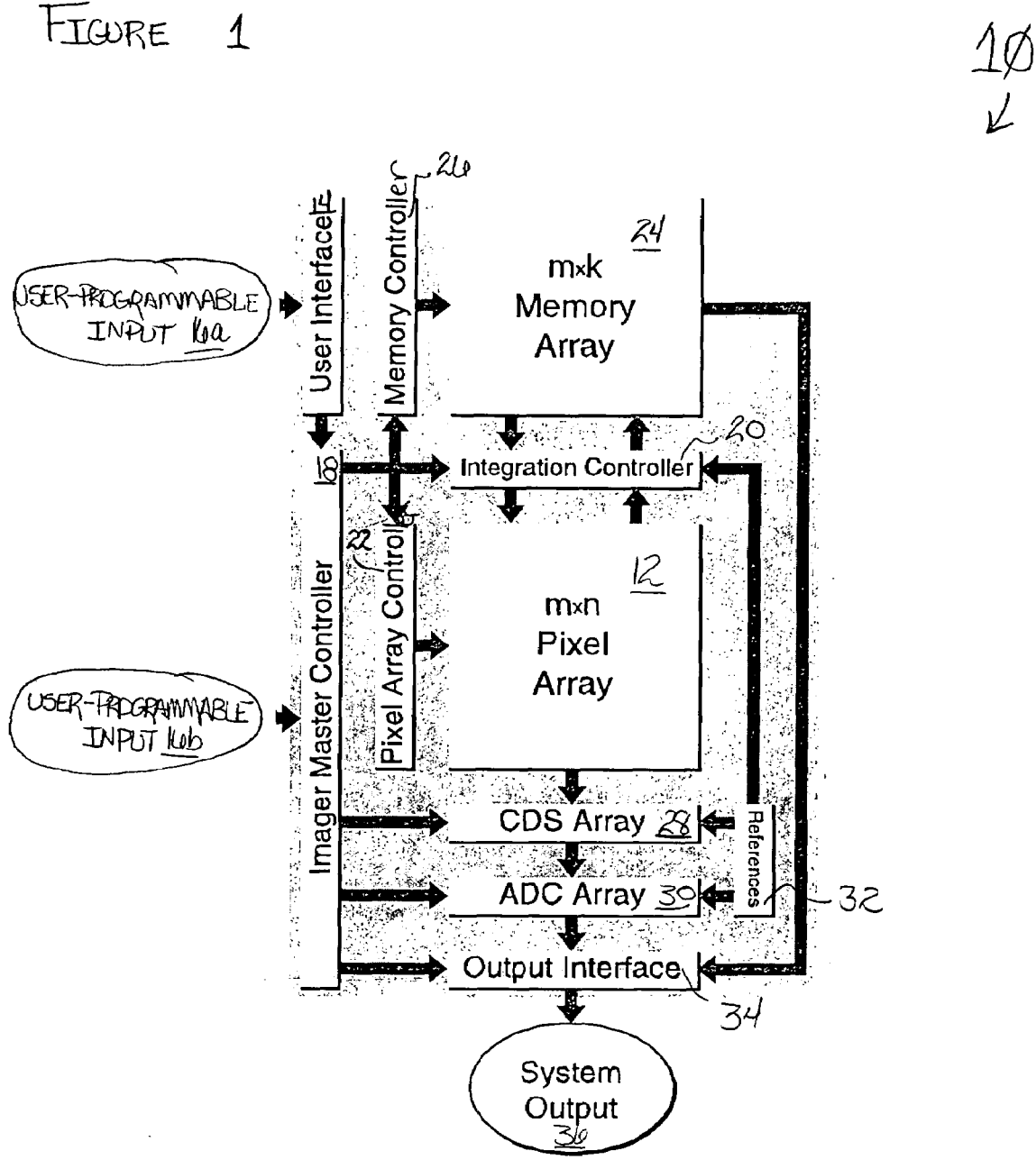
FIG. 1 is a block diagram of the imager system of the invention.

Referring to FIG. 1, there is shown an example imager system 10 provided by the invention. The imager system includes a pixel array 12 having a number, m, of pixel rows and a number, n, of pixel columns. This array can consist of, e.g., CMOS pixels, CCD pixels, or other selected pixel technology. The specific example provided here will be directed to CMOS pixel technology, but it is to be recognized that the imager system of the invention is not limited to such. Whatever pixel technology is employed, the pixel array is configured to enable exposure of the array to a scene for capture of illumination for producing an image of the scene.

In accordance with the invention, all of the pixels in the array can be independently reset and further can be non-destructively read. These features enable the pixel-specific and user-programmable dynamic range control of the invention described below. The user interface 14 of the system provides an abstraction layer between a user and the system for accepting user-programmable input data 16a such as a dynamic range increase factor, definitions for a sub-array of pixels to be employed, number of pixels to be employed, frame rate, output format, and other system parameters, specified below. Further user-programmable input data 16b, e.g., for specifying particular pixels to be employed in the array, can be accepted by the imager master controller 18, which directly or indirectly controls all of the subsystems of the imager.

The integration controller 20 implements the pixel-specific integration control method provided by the invention, as described below, based on the user-specified integration parameter values passed from the imager master controller 18. The pixel array controller 22 directs access to and control of specific pixels based on the imager master controller commands. The integration controller also manages the contents of a memory array 24 through a memory controller 26; access to the memory array is managed by the imager master controller 18. The memory array provides a number, m, of rows of memory cells and a number, k, of columns of memory cells. As explained below, the memory array is employed in accordance with the integration control method of the invention to store data associated with each pixel's integration.

Image data produced by the pixel array 12 is output to a correlated double-sampling (CDS) array 28 that can optionally be included for removing from the image data the level corresponding to a reset pixel. The CDS can be provided with programmable gain amplification control if such is desired for a given application. The image data processed by the CDS is passed to an analog-to-digital converter (ADC) array 30 for quantizing the image data. Reference data, e.g., electrical voltage or current data, corresponding to the selected pixel design, as well CDS and ADC designs, can be provided by a reference block 32 to the CDS and ADC arrays as well as the integration controller. An output interface 34 accepts digitized image data from the pixel array and associated pixel data from the memory array to format the image data in the format selected by the user. The imager system output 36 is provided by the output interface for, e.g., transmission on an output bus in a specified serial, parallel, floating point, or other selected format.

This imager system configuration enables a pixel-specific dynamic range control method provided by the invention for expanding the imager system dynamic range to a user-specified range. The dynamic range control of the invention employs a real-time technique that predictively scales the voltage of an imager pixel, as the pixel accumulates photogenerated charge during exposure to scene illumination, based on an expectation of the saturation of that pixel by the end of the specified imager integration period.

The phrase "integration period" refers to the maximum duration of exposure of an imager pixel, during one frame, to illumination from a scene for capturing the scene image for that frame. In general, in, e.g., a CMOS pixel array, the photodiode of each pixel in the array integrates, over at least a portion of the integration period, electronic charge that is photogenerated in the semiconductor in which the array is fabricated, as a result of exposure of the substrate to scene illumination. At the end of the integration period, a characteristic voltage of the pixel corresponds to the amount of charge integrated during the period. This pixel voltage indicates the illumination brightness at a point in the scene which corresponds spatially to the pixel.

Saturation of, e.g., a CMOS pixel, occurs when the pixel cannot accommodate integration of further photogenerated charge for the given operating voltages specified for the imager. The dynamic range, DR, of a pixel is generally defined as:

$$DR = \frac{|V_{RESET} - V_{D,MIN}|}{\Delta V_{RESET}}, \quad (1)$$

where $V_{RESET}$ is the reset voltage of the pixel; $\Delta V_{D,MIN}$ is the variation in pixel reset voltage, due, e.g., to noise, lack of complete reset, or other factors; and $V_{D,MIN}$ is the maximum allowable voltage variation for the pixel. This voltage variation is typically set by circuitry associated with a pixel array. For example, a pixel array column current source, if implemented for a pixel array, generally requires a minimum voltage across the device to maintain its operation. The maximum allowable pixel voltage variation must be set to accommodate this column current source operational requirement; for this example, the maximum allowable pixel voltage variation is approximately equal to the sum of the minimum operational voltage of the current source and the pixel read out amplifier offset.

The integration control method of the invention checks the integration status of a pixel prior to the end of an integration period and resets the pixel if it is predicted that the pixel will saturate by the end of the integration period or if the pixel has already saturated. The basis of this predictive control is geometrically illustrated in the plot of FIG. 2, which is directed to the characteristics of an $n^+$ diffusion, or n-well, p-type substrate CMOS photodiode. The reset voltage of the pixel is given as $V_{D,RESET}$ and the saturation voltage of the pixel is given as $V_{D,MIN}$. The integration period over which the pixel integrates photogenerated charge is given as $T_{INT}$. The plot line denoted LIMIT characterizes the evolution of the voltage of a pixel that just reaches its saturation point at the end of the integration period. This linear relationship between pixel voltage and integration time assumes a substantially constant illumination over the integration period.

At any selected intermediate point in time, e.g., $T_{CHECK}$, during the integration period, there is a voltage, $V_{D,CHECK}$, that corresponds to the voltage of the ideal linear voltage evolution line, LIMIT. Thus, a pixel having a measured voltage value of $V_{D,CHECK}$ at the time $T_{CHECK}$ can be expected to saturate at just the endpoint of the integration period. Given this linear relationship between pixel voltage and time, it is then seen that a pixel having a measured voltage value that is above $V_{D,CHECK}$ at the time $T_{CHECK}$ can be expected to not saturate prior to the end of the integration period. The voltage evolution line designated NS illustrates this condition. A pixel having a measured voltage value that is at or below $V_{D,CHECK}$ at the time $T_{CHECK}$ can then be expected to saturate prior to or at the end of the integration period. The voltage evolution line designated S illustrates this condition.

This example demonstrates the integration control principal of the invention, whereby for any intermediate check time prior to the end of an integration period, it can be determined if a pixel will saturate at a later time by comparing the pixel voltage against that voltage which, for the selected check time, corresponds to the linear limiting case as defined in FIG. 2. This predictive control principal is implemented in the control method of the invention in a manner that is pixel-specific, for enabling individual pixel control based on pixel-specific saturation expectations.

Figure 3:
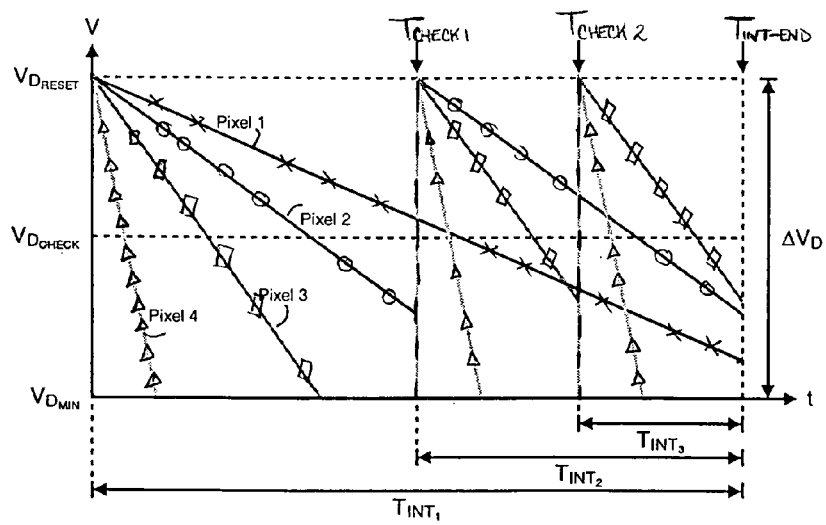
FIG. 3 is a plot of pixel voltage as a function of time for four example pixel values controlled in accordance with the invention during an integration period.

Referring to FIG. 3, an example implementation of this integration control method of the invention is shown by the time evolution of the voltages of four pixels. This example assumes a CMOS pixel photodiode produced as an $n^+$ diffusion, or n-well, in a p-type substrate. In the method, the total integration period specified for the pixel array is parceled into a number, M, of partially overlapping integration time slots that can be designated for any selected pixel, where the slots are designated 1, . . . ,i, . . . ,M. In the example of FIG. 3, the number, M, of integration slots is three. Each integration slot has a distinct starting time but all integration slots have a common end time that is coincident with the end of the total integration period, $T_{INT\text{-}END}$. Each integration slot is designated to be of a duration, $T_{INT(1)}$, that is shorter than that of integration slots having an earlier starting time.

A first integration time slot is designated to start at the beginning of the integration period and to extend to the end of the integration period; its duration, $T_{INT(i)}$ is therefore that of the total integration period. Each succeeding time slot is of a shorter duration. A ratio, $B_i$, of the duration of a given time slot to that of the next succeeding time slot is given as:

$$B_i = \frac{T_{INT(i)}}{T_{INT(i+1)}}. \tag{2}$$

For the example of FIG. 3, this ratio is two for all of the first, second, and third integration time slots, but this ratio need not be the same for each time slot, as explained further below.

At the commencement of the integration period for a pixel array, the first integration time slot is also commenced, as shown in FIG. 3. Then at a selected first intermediate check time, $T_{CHECK(1)}$ before the end of the first integration time slot, the voltages of each of the pixels are compared to a reference voltage, $V_{D,CHECK}$, that corresponds to that voltage for the limiting case where a pixel would saturate just at the end of the first integration time slot, as defined in the plot of FIG. 2. The time of the first check is set by the preselected relationship between the duration of the various integration time slots; the check time is coincident with that time at which the second integration slot is to begin.

The reference voltage $V_{D,CHECK}$ is defined for a given time slot i as:

$$V_{D,CHECK(i)} = V_{D,RESET} - \Delta V_D \cdot \left(1 - \frac{T_{INT(i+1)}}{T_{INT(i)}}\right), \tag{3a}$$

for electron integration, $$V_{D,CHECK(i)} = V_{D,RESET} + \Delta V_D \cdot \left(1 - \frac{T_{INT(i+1)}}{T_{INT(i)}}\right), \text{for hole integration} \tag{3b}$$

Figure 2:
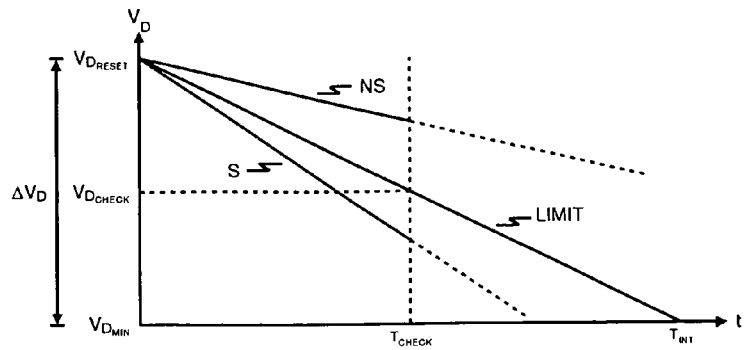
FIG. 2 is a plot of a pixel voltage as function of time for a pixel that saturates just at the end of an integration period, demonstrating the principal of the integration control method of the invention.

These relations provide the specification of $V_{D,CHECK}$ for the relationship illustrated in the plot of FIG. 2, where $\Delta V_D$ is defined as the dynamic voltage range of the pixel. The inverse of the integration slot duration ratio, $B_i$, in expression (2) above, can be substituted in these relations. If the ratio of integration slot duration in relations (3a) and (3b) is constant for all of the integration slots, the check voltage will be constant throughout the integration period; otherwise, the check voltage is adjusted during each integration slot based on these relations for the current integration slot. It is to be recognized that the integration control method does not impose restrictions on the minimum or maximum duration of an integration slot.

Any pixel that is predicted to saturate or which has already saturated at the time of the voltage check is individually reset; all other pixels are not reset, are permitted to continue integrating, and are not checked again prior to the end of the total integration period. For any reset pixel, a new integration slot is begun, e.g., the second integration slot, and a voltage check of such pixels is then made at an intermediate time during the second integration slot. Pixels found here to be saturated or for which later saturation is predicted are then reset again and specified to begin a new integration slot, e.g., the third integration slot. This iterative pixel voltage check, pixel reset, and pixel integration slot commencement is continued until the end of the total integration period is reached.

Figure 4:
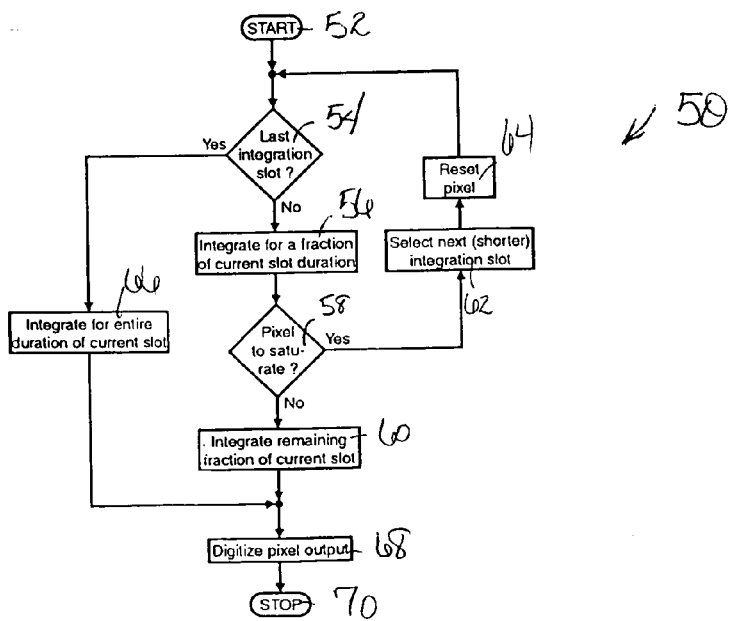
FIG. 4 is a flow chart of the integration control method of the invention.

Referring to the example of the plot of FIG. 3 and also to the flow chart of FIG. 4, in the control method 50, once the method is started 52 and an integration period is begun, in a first step 54 it is determined if at the current time the last integration slot is being carried out. If not, then the pixels are controlled to integrate 56 for some specified fraction of the current integration slot duration. At the end of this fraction of time, a voltage check of each of the pixels is carried out to determine 58 if any of the pixels have saturated or are predicted to saturate. The appropriate one of the relations (2a) or (2b) above is here employed for determining the correct voltage reference to be employed at a given check time. For the example of FIG. 3, the ratio of each time slot duration to the next time slot duration is constant and is equal to two, whereby the check voltage is constant for the entire integration period.

As shown in FIG. 3, at the time of the first check, $T_{CHECK(1)}$, pixel one is found not to be expected to saturate, pixel two is expected to saturate, and pixels three and four have already saturated. If it is determined that a given pixel has not and will not saturate, then that pixel is not reset and thereby is enabled to integrate 60 for the remaining fraction of the current integration slot. In FIG. 3, it is seen that pixel one, which is predicted to not saturate, is permitted to integrate for the entire duration of the first integration slot. If it is found that a pixel has already or will saturate, as is the case for pixels two, three, and four, then that pixel is specified to integrate 62 during a next, shorter, integration slot and the pixel is reset 64 to begin this new integration slot. Reset for integration during a second time slot is shown in FIG. 3 for pixels two, three, and four.

After integration over a fraction of the second integration slot, until a time coincident with the preselected start time for a third integration slot, the voltages of pixels two, three, and four are again compared to a reference voltage based on relations (3a) or (3b) above, where the voltage is a constant. It is found that pixel two will not saturate during the second integration time slot, that pixel three will saturate, and that pixel four has already saturated. Following the flow chart of FIG. 4, pixel two is therefore permitted to continue integrating to the end of the second integration slot, while pixels three and four are reset to begin integrating in a shorter, third integration slot.

Note again that at any given voltage check, a pixel found not to already or to later saturate, like pixel one at the first check and pixel two at the second check, both in FIG. 3, is not checked again. If pixel one had been checked at the second check time, $T_{CHECK(2)}$, the system would have incorrectly expected pixel one to saturate at a later time, based on the linear saturation limiting relationship for the parameters of the second integration slot. With this control, the invention accommodates and ensures a correct output for any number of integration time slots. This is an important advantage because, as discussed in detail below, the degree of expansion of dynamic range enabled by the invention is increased for larger numbers of integration slots, and such can be preferred for many applications.

During the third integration slot, in following the method of FIG. 4, at step 54 it is determined that the last integration slot during the entire integration period is being carried out. In this case, all pixels which were reset at the start of this slot are permitted to integrate 66 for the entire slot. Then at the end of the third integration slot, which corresponds to the ends of the first and second integration slots, as well as the end of the total integration period, the voltage output of each pixel is determined and digitized 68 for output at the end 70 of the method. With this method, over the course of the integration period a saturation prediction check is made in every integration slot but the last. Note the duration of the total integration period is the same as the duration of the first and longest integration time slot, not the sum of all the integration slots employed.

There is a particular advantage provided by the requirement of the control method that all integration time slots terminate together, simultaneously with the end of the total integration period. If an integration slot were instead to terminate at a time earlier than the end of the integration period, the pixel or pixels corresponding to that integration slot would be required to maintain their charge steady until the end of the total integration period. But generally, because illumination of the pixel array is automatically continued until the end of the total integration period, photogenerated charges that originate in the semiconductor substrate region of the photodiode are likely to diffuse lengths that are typically much larger than the pixel width or length. Such charges could easily reach the storage node in the pixel and significantly alter the maintained charge value prior to its read out. The resulting erroneous pixel value might be multiplied by a large number or factor during post read out processing, thereby exacerbating the error. The integration control method of the invention eliminates this possibility by providing multiple, independent integration time slots that each begin at a distinct time but all of which end simultaneously, at the end of the integration period, so that integrated charge is read out and digitized immediately following the termination of any given integration slot.

Also note that although no predictive voltage check is made during the last integration slot, the only pixels that are saturated at the end of the total integration period are those which received an illumination level resulting in saturation during the shortest integration slot, which is also the last integration slot.

At the end of the total integration period, the output voltage value of a pixel is scaled based on the number of times the pixel was reset and the relative duration of the integration slots through which the pixel integrated, to specify a "virtual" voltage value to which the measured value corresponds. In general, this scaling factor, $J(m)$, is given as:

$$J(m) = \begin{bmatrix} \prod_{i=1}^{m-1} \frac{T_{INT(i)}}{T_{INT(i+1)}} = \prod_{i=1}^{m-1} B_i, m = 1, \ldots, M \\ 1, m = 0 \end{bmatrix} \quad (4)$$

where m is the number of the last integration slot for which the pixel of interest was reset to begin integrating and $B_i$ is the integration slot duration ratio given above in expression (2).

A digitized pixel output, $d_D(I)$, where I is the pixel output in selected units of, e.g., charge, current, or voltage, can then be produced, as a function of the scaling factor, $J(m)$, as:

$$d_D(I) = J(m) \cdot Q(I), \quad (5)$$

where $Q(I)$ is the quantized pixel output, whether it be charge, current, or voltage.

For those applications in which the ratio of the duration of each integration slot with that of the next succeeding integration is constant for all integration slots, this relation simplifies to a digitized pixel output, $d_D(I)$, where I is the pixel output in selected units of, e.g., charge, current, or voltage, is given as:

$$d_D(I) = B^{m-1} \cdot Q(I); \quad (6)$$

For the example configuration to which FIG. 3 corresponds, where each time slot is half the duration of the preceding time slot, the quantized pixel output is therefore scaled by a factor, $2^{m-1}$, to compensate for the integration control scaling and thereby to determine the virtual, expanded illumination value to which the integrated value of a given pixel corresponds. It is preferable that this scaling operation be carried out in the digital domain because the expanded voltage range of a pixel that results from the integration control method typically is greater than the imager array chip power supplies and the dynamic range of any amplifier, ADC, or quantization circuitry included on the image array chip.

Figure 5:
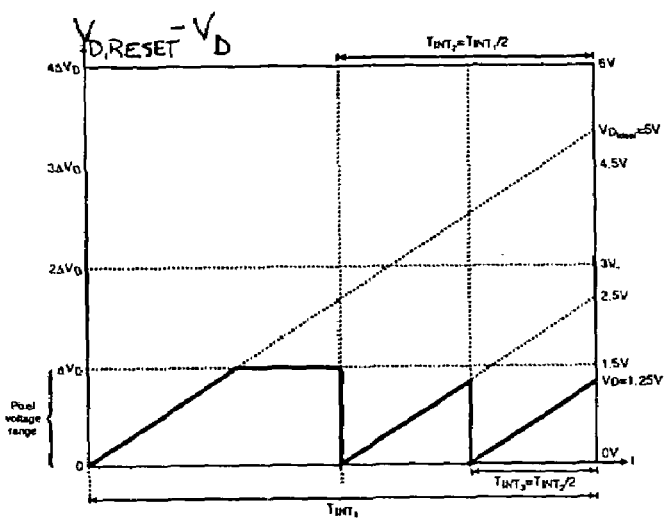
FIG. 5 is a numeric plot of pixel voltage as a function of time for the third pixel in the plot of FIG. 3.

An example of the evolution of application of this compensation scaling is illustrated in the plot of FIG. 5. FIG. 5 provides a numerical time evolution plot of voltage for the integration control shown for pixel three in FIG. 3. Pixel three was reset twice, after saturating before the first check time and after being predicted to saturate after the second check time. The pixel voltage evolution at the start of the integration period corresponds to a virtual, ideal pixel output voltage, $V_{D,IDEAL}$, at the end of the integration period, of 5 volts. The integration control method of the invention results in a measured pixel output voltage, $V_D$, of 1.25 V. Application of relation (3) above to this measured output, as $2^{3-1}(1.25\text{ V})$, produces this virtual voltage value for the pixel. This example in the plot of FIG. 5 illustrates that the integration control method acts to predictively scale the photogenerated electrical quantity produced by an ideal pixel with unlimited dynamic range to fit this quantity in the practical range of a real pixel having a limited dynamic range. The measured output of the real pixel is manipulated to produce the corresponding, desired output that would be produced if the pixel were ideal with an unlimited dynamic range.

Based on this technique, the quantized pixel output voltage, $Q(V_D)$, for a voltage-output pixel, is then given by the invention, in general, as:

$$Q(V_D) = \left\lfloor (2^N - 1) \cdot \frac{V_D}{\Delta V_D} \right\rfloor \Rightarrow Q(V_D) = \left\lfloor (2^N - 1) \cdot \frac{V_{D,IDEAL}}{J(m) \cdot \Delta V_D} \right\rfloor; \quad (7)$$

where N is the ADC resolution in bits, and $\lfloor \cdot \rfloor$ is the floor function, which rounds its argument to the closest integer toward zero. For an integration slot duration ratio, B, that is constant over an entire integration period, e.g., as in the example plotted in FIG. 3, where B=2, $J(m)$ reduces to $(2^{m-1})$, whereby for the example given, $(2^{m-1} \cdot \Delta V_D)$ is the new "virtual" reference voltage to which $V_{D,IDEAL}$ is compared as the integration proceeds.

The integration control method does not impose a requirement for a particular pixel read strategy, and consequently, a pixel array can be checked with a single scanner line or with multiple scanner lines. Regardless of the pixel read strategy employed, as a result of the pixel voltage scaling, the integration control method of the invention extends the real pixel voltage range by a dynamic range expansion factor, K, where $$K = \frac{T_{INT,MAX}}{T_{INT,MIN}} = J(M); \quad (8)$$

where $T_{INT,MAX}$ is the duration of the longest integration time slot and $T_{INT,MIN}$ is the duration of the shortest integration time slot, and where M is the total number of integration time slots provided.

For the example described in the plot of FIG. 3, where each integration slot is twice the duration of the next-started slot, this reduces to a relation where $$K = 2^{M-1}; \quad (9)$$

Figure 6:
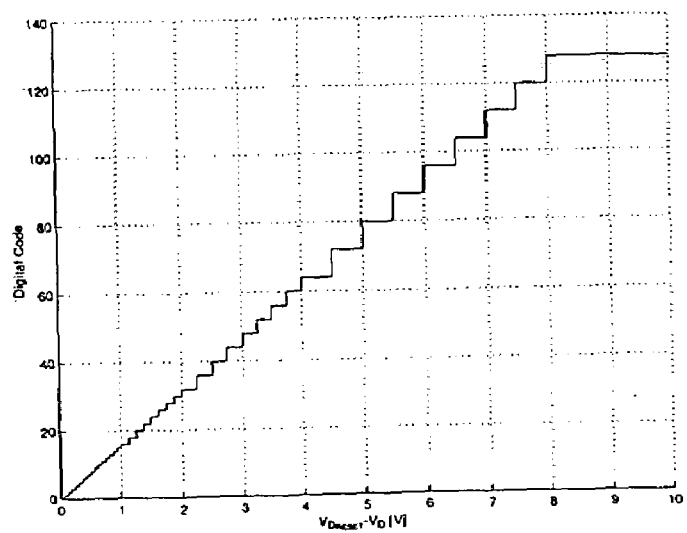
FIG. 6 is a plot of the transfer characteristic of the integration control method of the invention.

This digital scaling and corresponding dynamic range expansion results in a digital output that increases in steps of size $J(M) = 2^{m-1}$, for the example of the plot of FIG. 3, as shown in the plot of FIG. 6, for an example where four integration slots are employed with a 4-bit ADC, and a photodiode dynamic voltage range of 1.5 V.

This transfer characteristic is a manifestation of the fact that the integration control method produces a large virtual pixel voltage range that can be quantized with variable precision depending on the integration slot employed for a given pixel. In other words, rather than interpreting step sizes greater than unity as the existence of missing digital codes, the system quantizes a virtual voltage range to at least N bits.

It is further found that the integration control method of the invention provides resolution of pixel illumination intensity that is directly dependent on the number of integration slots employed for integration by a given pixel. The digitized intensity bin size, BS(m) of a selected integration slot number, m, is given as:

$$BS(m) = \frac{2^{m-1} \cdot \Delta V_D}{2^N} \Rightarrow BS(m) = \frac{\Delta V_{D,IDEAL}}{J(M) \cdot 2^{N-m+1}}. \quad (10)$$

If the ratio of integration slot durations is constant for an entire integration period, then this relation (10) simplifies as:

$$BS(m) = \frac{\Delta V_{D,IDEAL}}{B^{M-1} \cdot 2^{N-m+1}}, \quad (11)$$

where $\Delta V_{D,IDEAL}$ is the maximum "virtual" voltage range that can be achieved with the integration control method of the invention.

The first articulation of this relationship in expression (5) indicates that the integration control method results in the ability to quantize a variable virtual voltage range with an ADC of fixed resolution. The second articulation of this relationship in expression (5) indicates that the virtual voltage range of a pixel, $\Delta V_{D,IDEAL}$, is quantized by an ADC of variable resolution.

For the example given above relating to the plot of FIG. 3, where B is a constant equal to two, then at its minimum, where m=M, this variable-resolution conversion has the resolution of the system ADC, but at its maximum, where m=1, the resolution is extended to N+M−1 bits, where M−1 most significant bits have been added by the integration control method. Table 1 below provides an example that highlights this characteristic of the integration control method.

TABLE 1

| m | Virtual Range (V) | BS (V) | Equivalent Number of Bits |
|---|---|---|---|
| 1 | 0.0–1.5 | 1.46 m | 18 |
| 2 | 1.5–3.0 | 2.93 m | 17 |
| 3 | 3.0–6.0 | 5.86 m | 16 |
| 4 | 6.0–12.0 | 11.72 m | 15 |
| 5 | 12.0–24.0 | 28.44 m | 14 |
| 6 | 24.0–48.0 | 46.88 m | 13 |
| 7 | 48.0–96.0 | 93.75 m | 12 |
| 8 | 96.0–192.0 | 187.50 m | 11 |
| 9 | 192.0–384.0 | 375.00 m | 10 |

With this example, it is shown that while the intensity bins increase as the integration slot duration decreases, the step size of the digital code increases by the same amount. As a result, the quantized transfer characteristic of the integration control method of the invention is completely linear, as illustrated in the plot of FIG. 6.

Of particular advantage is the sensitivity of the pixel transfer characteristic that results from the integration control method of the invention. The sensitivity of a pixel transfer characteristic is defined as the percentage or fractional change in a pixel output per percentage or fractional change of illumination received by the pixel. The sensitivity of a pixel, $S_D(I)$, can be expressed as:

$$S_D(I) = \frac{\partial O_D(I)}{\partial I} \cdot \frac{I}{O_D(I)}; \quad (12)$$

where $O_D(I)$ is the electrical output of the pixel, whether as charge, current, or voltage. Given that the interpolated quantized pixel value transfer characteristic of the integration control method of the invention, as plotted in FIG. 6, is purely linear, then expression (6) can be simplified to show that the sensitivity of the quantized pixel value transfer characteristic is unity. This result, with $S_D(I)=1$, holds for all linear pixel transfer characteristics, regardless of the slope of the characteristic, because the percentage change in pixel output resulting from a particular illumination change will always be constant, irrespective of the particular point in the illumination range where the change occurs.

Figure 7A:
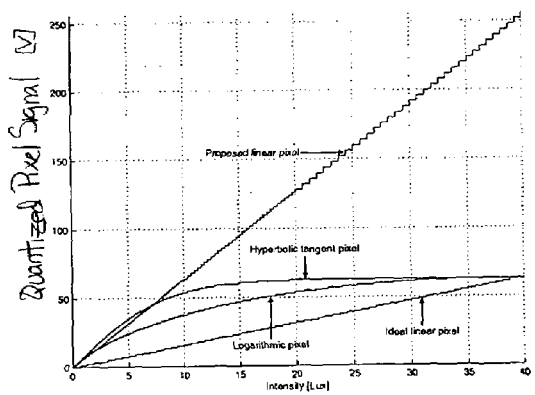
FIG. 7A is a plot of the transfer characteristic of the integration control method of the invention and that of hyperbolic tangent, logarithmic, and ideal linear systems.
Figure 7B:
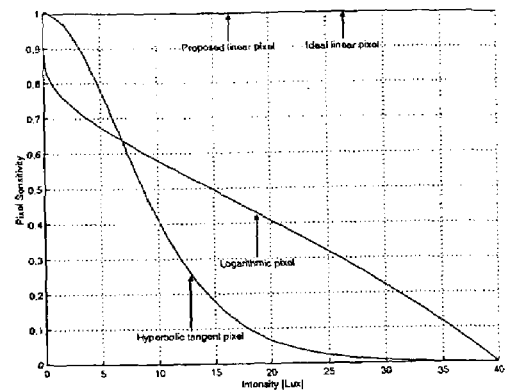
FIG. 7B is a plot of pixel sensitivity for the transfer characteristic of the integration control method of the invention and that of hyperbolic tangent, logarithmic, and ideal linear systems.

FIG. 7A provides a plot including the linear transfer characteristic of the control method of the invention, taken from the plot of FIG. 6, along with the transfer characteristics of three other systems that implement pixel-level solutions to increase pixel dynamic range, namely, hyperbolic, logarithmic, and ideally linear characteristics. FIG. 7B is a plot of the sensitivities of the four characteristics. The "ideal" linear characteristic is based on an "ideal" pixel characterized by the original voltage range of the photodiode, but which can capture the entire illumination range that can be captured in accordance with the invention. The pixel is therefore "ideal" because only an unrealistically large photodiode or storage capacitor could provide the characteristic.

The plot of FIG. 7B points out that the sensitivity of the transfer characteristic provided by the invention is identical to that of an ideal linear transfer characteristic and is unity across the entire illumination range. This far surpasses the sensitivity of the other transfer characteristics. Only a pixel control scheme resulting in a constantly increasing transfer characteristic slope could have a sensitivity better than that of the linear characteristic of the invention. However, a pixel structure and control scheme with an increasing characteristic slope, if such could be implemented, would not be practical for imaging applications due to the corresponding inherently very poor response produced at relatively low illumination levels and the accentuated response produced at high levels.

Figure 8A:
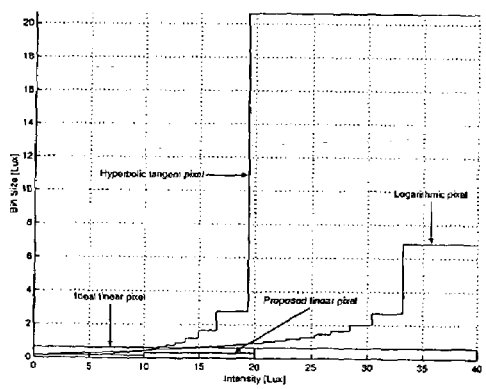
FIG. 8A is a plot of bin size, in lux, as a function of intensity, in lux, for the transfer characteristic of the integration control method of the invention and that of hyperbolic tangent, logarithmic, and ideal linear systems.

FIG. 8A is a plot of bin size as a function of illumination for an ideal linear transfer characteristic, as well as for the linear transfer characteristic of the invention, a logarithmic transfer characteristic, and a hyperbolic tangent transfer characteristic. The ideal linear characteristic is seen to have a constant bin size. The logarithmic and hyperbolic tangent characteristics have non-uniform bin sizes because the characteristics are non-linear. The linear characteristic provided by the invention also results in a non-uniform bin size because an ADC of fixed precision is employed to digitize an increasingly virtual voltage range, as explained earlier.

Figure 8B:
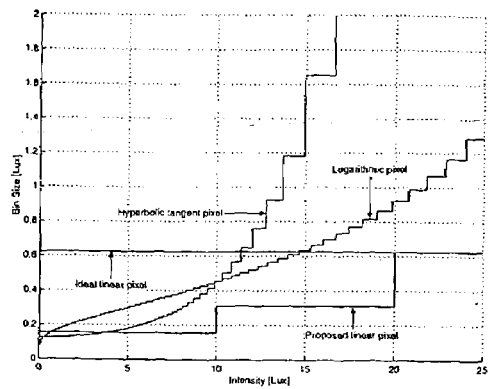
FIG. 8B replots the bin size data of FIG. 8A near to the origin.

FIG. 8B replots the data of FIG. 8A for bin sizes close to the origin. Here it is pointed out that the linear transfer characteristic of the invention outperforms all other characteristics except at a small interval around the origin. The reason for this is that to provide better intensity resolution than the linear characteristic of the invention, the starting slope of the non-linear transfer characteristics must be larger than that of the linear characteristic. This requires, however, that the non-linear characteristics must rapidly increase as a function of voltage. Because a pixel-based implementation of a non-linear characteristic is inherently limited to the dynamic voltage range of the pixel, at some intensity level the slope of the non-linear characteristic must dramatically decrease. This decrease must occur somewhere in the original pixel illumination range, and the steeper the initial slope of a characteristic, the closer the point of decrease moves toward the origin. As a result, the performance improvement this achieves near to the origin is costly as it not only occurs in a very limited region, but it also requires a severe degradation in sensitivity and intensity resolution outside this limited region.

The linear transfer characteristic provided by the integration control method of the invention eliminates this performance degradation. The method not only enables a significant increase in the dynamic range of substantially any pixel, but also provides a superior transfer characteristic for all or nearly all of the dynamic range of the selected pixel. The region of the dynamic range where the transfer characteristic is suboptimal is very limited, and in the other regions, the performance improvement over other transfer characteristics is substantial.

Although the integration control method of the invention can be employed for any in a wide range of pixel designs and configurations, it is preferred that the selected pixel configuration enable individual, pixel-specific, reset and enable non-destructive reading of the pixel charge integration condition at intermediate times during an integration period. FIG. 9A provides a circuit diagram of a particularly well-suited pixel design provided by the invention for the imager system of the invention and its associated integration control method. FIG. 9B plots the signal timing associated with operation of the pixel. This pixel design is preferred for many applications because it requires only one additional transistor, $M_5$, and two additional control signals, ResetSelect and ResetPulse, beyond a conventional voltage-output CMOS pixel. These relatively minor increases in pixel size and complexity enable single pixel addressability and lag-free pixel reset.

The pixel provides four operating modes, namely, Conditional Reset Mode, Integration Mode, Hold Mode, and Read Mode. The operation and signal timing for each of these modes is presented below, for an example configuration of an $n^+$ diffusion, or n-type well, in a p-type semiconductor substrate.

Conditional Reset Mode—Row Activation Phase: The Shutter signal is set to a high state, if it is not already, to ensure that the pixel nodes $V_D$ and $V_C$ are correlated, in anticipation of the possibility that the pixel will need to be reset. The ResetSelect signal is also set to a high state, here to select a particular pixel row for possible reset. The $COMP_i$ signal is set to a low state, which is the default, i.e., no reset, state of this signal. Finally, the RowSelect and nColRead signals are set to a high state. In the pixel, this results in the transistor $M_1$ and the column current source $I_{COL}$ forming a source follower amplifier configuration that eventually sets the $OUT_i$ line to the current pixel voltage minus an offset voltage. The duration of this phase depends on the parasitics of the control signal lines and the output line.

Conditional Reset Mode—Comparison Phase: When the $OUT_i$ line has settled, the integration controller, 20 in FIG. 1 and described below, compares the voltage of the $OUT_i$ line to a specified reference check voltage, in the manner explained above. The duration of this phase depends on the propagation delay of the comparator employed in the integration controller.

Conditional Reset Mode—Possible Reset Phase: If the integration controller determines, based on the integration control method provided by the invention, that the pixel should be reset, then the $COMP_i$ line of the pixel is pulsed to a high state during this phase. This results in a condition where transistors $M_4$ and $M_5$ of the pixel implement a Boolean logical AND gate function having inputs of the ResetSelect line and the $COMP_i$ line and having an output, when the AND gate function is true, i.e., logic high, which signals for the reset of the photodiode, $D_1$, of the pixel.

In a conventional pixel control method, the reset level is maintained constant. In contrast, in the control method of the invention, a reset pulse is employed, which achieves a lag-free reset of the pixel. When a pixel receives little illumination, the voltage of the pixel photodiode does not change significantly from its reset value. As a result, when the next reset cycle commences, the subthreshold current of the transistor $M_4$ of the pixel continues to charge the photodiode and thus, the reset level increases with each reset cycle.

In the preferred imager operation of the invention, the pixel integration voltage is read at the immediate end of a total integration period, then the pixel is reset and read again. The two read values, namely, the pixel integration value and the pixel reset value, are subtracted to obtain the final pixel output value. Although the reset voltage is not the actual photodiode voltage at the start of an integration period or slot, in most cases the values of these voltages are close enough that any offset due to the reset value or due to low frequency noise is eliminated. This may not be true, however, for particularly low illumination levels, where the reset level increases. Here the pixel output value for a given frame can be a function of the illumination received in a previous frame or frames, producing the optical effect known as image lag.

This condition is eliminated in the invention by maintaining the ResetPulse line at a low state at the start of the $COMP_i$ signal pulse and then pulsing the ResetPulse line to a high state. As a result of this timing control, the pixel photodiode is first discharged completely to remove any charge accumulated during previous frames, and is then charged back up. After this action, the ResetSelect is maintained in a high state until the $COMP_i$ signal has gone to a low state, while the ResetSelect signal is kept at a high state, to avoid the possibility of discharge of the pixel photodiode. During the Possible Reset phase of pixel operation the RowSelect line can be set to a low state to enable the system to start reading the next pixel row even while a current row is possibly being reset. The duration of this phase is highly dependent on the parasitics of the control signal lines.

Conditional Reset Mode—Row Deactivation Phase: The control signals are returned to their default state during this phase. To avoid inadvertent photodiode discharge, the ResetPulse line is maintained at a high state until the pixel transistor $M_4$ turns off. The $COMP_i$ line has to be returned to a low state after the photodiode reset because the gate of the pixel transistor $M_4$ must be grounded to bias this transistor in its cut-off region of operation. This is achieved by setting the $COMP_i$ line to a low state towards the end of the pixel reset cycle, while the ResetSelect is still in a high state. If the $COMP_i$ line would not be pulsed but rather held in a high state, then the pixel transistor $M_4$ would remain on, and photogenerated charge would be lost through the ResetPulse terminal of the pixel.

Integration Mode: In this mode, the ResetSelect and RowSelect lines are maintained in a low state while the Shutter line is maintained in a high state. With this control condition, the pixel photodiode can integrate photogenerated charges that are distributed between the photodiode capacitance, shown in FIG. 9A in dotted lines, and the gate capacitance of the pixel transistor $M_1$. Given that this example pixel is an $n^+$ diffusion, or n-type well, in a p-type substrate, then the voltages at the pixel nodes $V_D$ and $V_C$, which are electrically connected by way of the pixel transistor $M_3$, decrease from the reset level at a rate that depends on the illumination received in the semiconductor substrate at the pixel location.

Hold Mode: In this mode, the ResetSelect and RowSelect lines are held in a low state while the Shutter line transitions from a high state to a low state at the start of this mode. The pixel transistor $M_3$ and the gate capacitance of the pixel transistor $M_1$ form a sample-and-hold circuit, which enables the storage of a sample of the pixel photodiode voltage, $V_D$, in the gate of the pixel transistor $M_1$, as $V_C$, such that this value can be non-destructively read many times.

The shuttering operation introduces a non-linear component to the pixel output voltage value because there will be some charge injection that is dependent on the stored photodiode voltage level, which is a function of the illumination received by the pixel. As the photodiode continues to receive illumination, the value of the $M_1$ gate voltage, $V_C$, continues to drop so that after the Shutter signal has been set to a low state, the only way to regain coherence between the voltages $V_C$ and $V_D$ without any nonlinear effect, such as charge sharing, is to reset the pixel.

Read Mode—Row Activation Phase: In this phase, the RowSelect and the nColRead signals are transitioned to a high state.

Read Mode—Buffer Phase: In this phase, the pixel behavior is dependent on the state of the Shutter line. If the Shutter line is in a high state, then the values of the voltages $V_C$ and $V_D$ are equal and the system can non-destructively read the pixel voltage value. Because both of these voltages change as a function of the illumination received by the pixel, this read cycle preferably is short. When the Shutter signal is in a low state, then the value of the voltage $V_C$ is a sample of the voltage $V_D$ and this voltage can be read multiple times without restrictive timing constraints.

FIGS. 10A–10E present circuit diagrams of five additional example pixel designs provided by the invention. While no particular pixel design is required by the invention, these examples point out features that can be preferred for some applications.

Figure 10A:
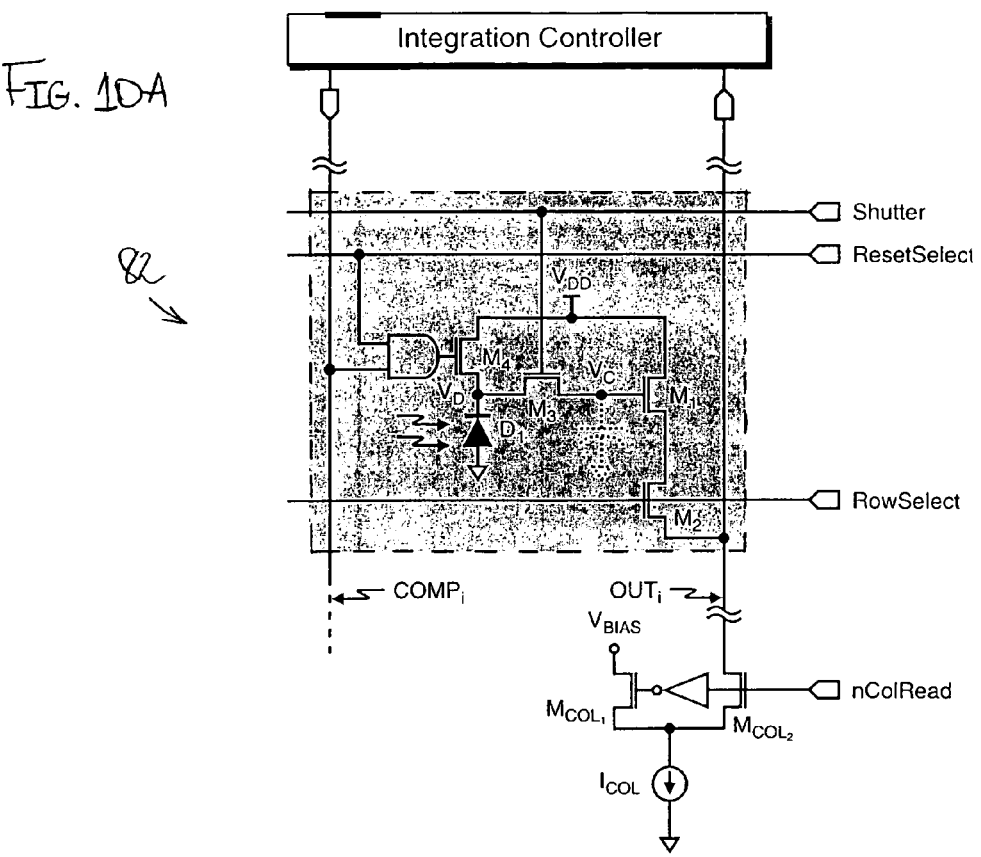
FIGS. 10A–10E are circuit diagrams of additional pixel configurations provided by the invention.

Referring to FIG. 10A, this pixel configuration 82 implements a reset transistor, $M_2$, that is controlled by an AND gate which will only reset the pixel when the ResetSelect line associated with the pixel row and the $COMP_i$ line associated with the pixel column are both in a high state. These two signals provide independent X-Y addressing for each pixel in a pixel array with the use of an actual AND gate. Unlike the pixel of FIG. 9A, this pixel configuration does not enable lag-free reset, but such can be included by connecting the drain of the pixel $M_4$ transistor to a ResetPulse line rather than to the power line $V_{DD}$.

Figure 10B:
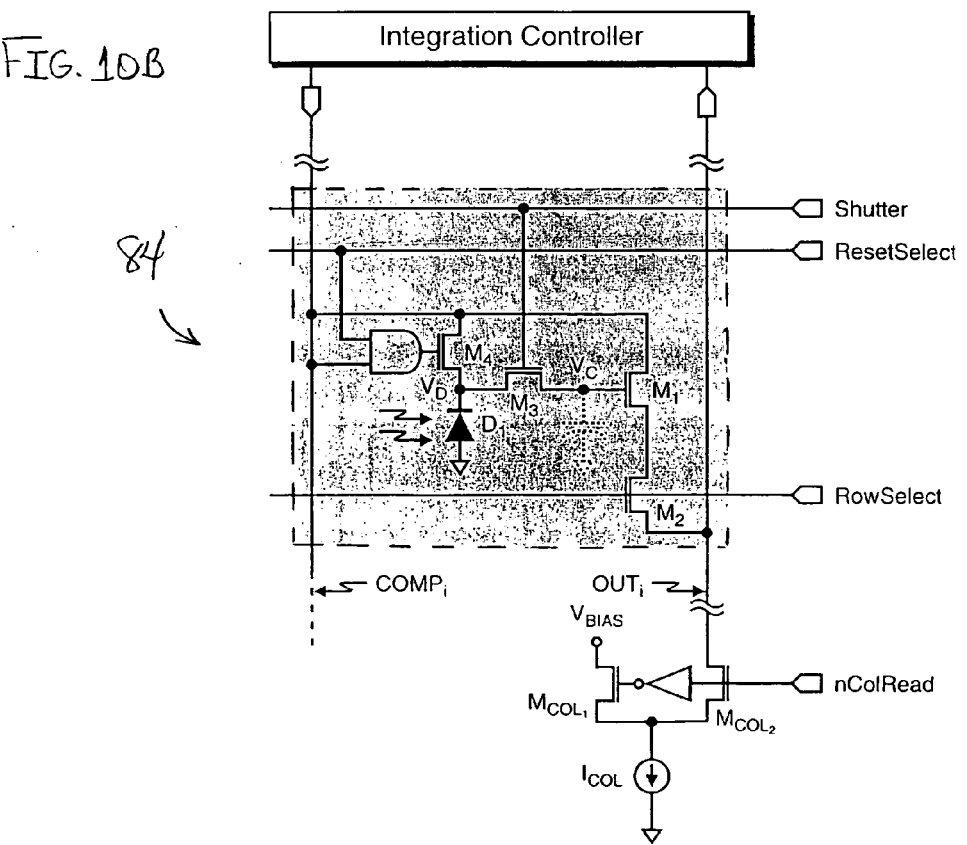

The pixel configuration 84 of FIG. 10B is similar to that of FIG. 10A, but here the COMP line is time-multiplexed to provide both the reset decision signal control as well as power to the source follower amplifier. This variation of connection of the drain of the source follower to the $COMP_i$ line, which can be applied to all subsequent pixels, requires that there not be concurrent pixel reset and pixel read operations in a particular pixel column. However, this configuration is preferred in fabrication processes that can support only a relatively few number of metal layers, where typically the uppermost metal level is used as a light shield, covering all the pixel area except the photodiode, and as a power plane. In this case the $COMP_i$ line is preferably sized accordingly to the current it is to deliver in the pixel read phase, but the number of signals that have to be routed to and through the sensing array is reduced by one.

Figure 10C:
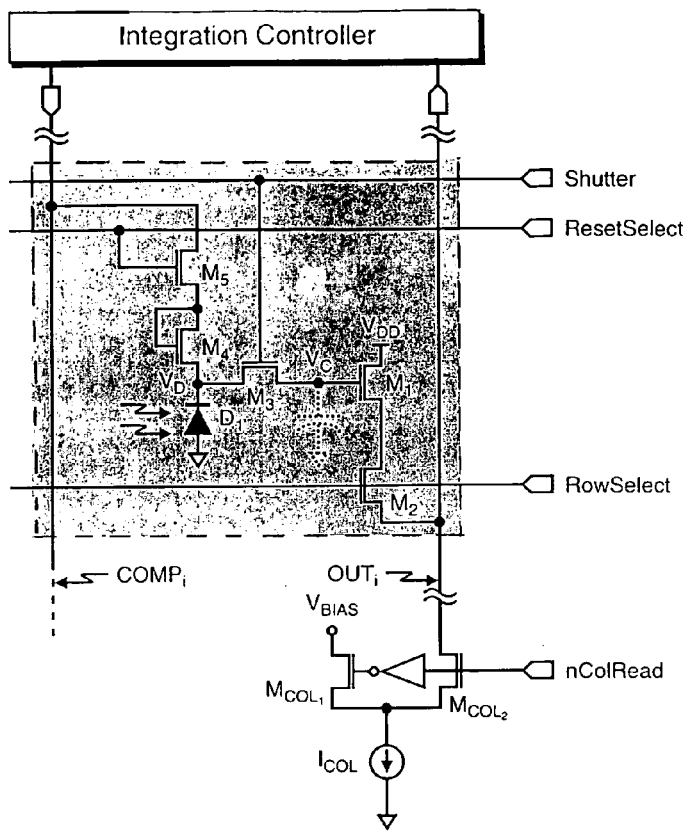

FIG. 10C illustrates a pixel configuration 86 which provides a read-out circuit configuration like that of the pixel of FIG. 9A. The reset circuit configuration of this pixel is adjusted, however, such that ResetSelect line directly drives the reset select pixel transistor, $M_5$, and one of the pixel transistors, $M_4$, is diode-connected. To reset this pixel, the ResetSelect line associated to the pixel row is set to a high state and the pixel is reset if the $COMP_i$ line is at a high state. As in the pixel of FIG. 9A, the photodiode reset voltage is at a maximum two threshold voltages below the high voltage state of the ResetSelect line, which typically is the supply voltage, $V_{DD}$. The $COMP_i$ line still has to be pulsed, to remove the charge from the gate of the diode-connected transistor $M_4$. If this is not done, the charge in this node would leak out through the photodiode, contaminating the light signal. This can happen because the gate of the diode-connected transistor is at $V_{DD}-V_T$, assuming a high digital state equal to the power supply, and the photodiode is reset up to approximately $V_{DD}-2V_T$.

Figure 10D:
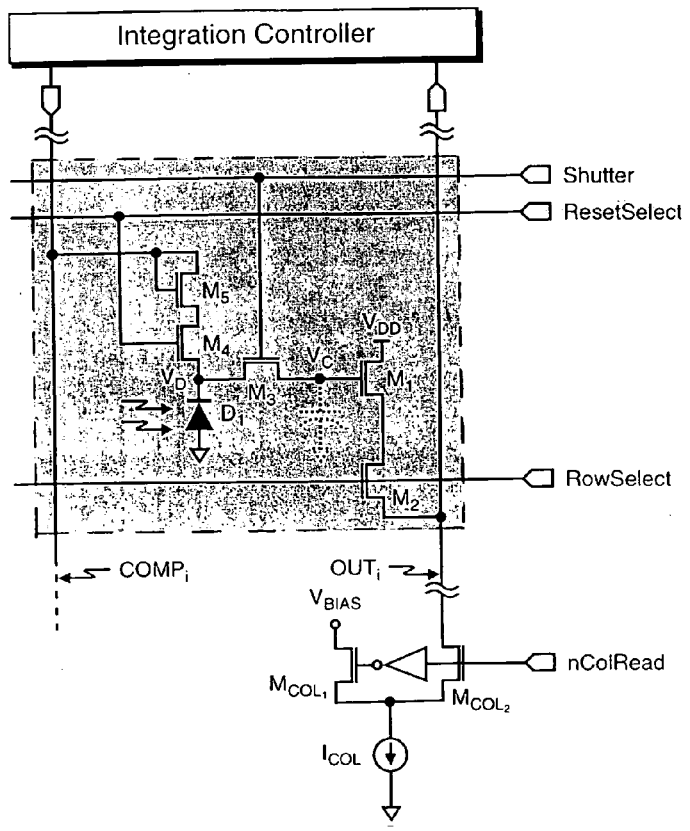

FIG. 10D presents a circuit diagram of a further example pixel configuration 88, which is like that of FIG. 10C but adapted with the diode-connected transistor and reset select transistors switched. This pixel is controlled in the same manner as the previous pixel, but the $COMP_i$ line does not have to be pulsed. As a result, however, when the pixel is reset, the source of the diode-connected pixel transistor $M_5$ is at $V_{DD}-V_T$, and there is no way of discharging this node from the $COMP_i$ line because the diode is in the discharge path. When the pixel is not to be reset, the $COMP_i$ line is in a low state, but the reset select transistor $M_4$ turns on and there is charge sharing between the photodiode and the diode-connected transistor source. This can happen each time a pixel value check is made during an integration period. This condition can be eliminated by setting the pixel design such that the photodiode capacitance is much larger than the source capacitance of the pixel transistor $M_5$. Theoretically, this pixel configuration enables a complete pixel array to be reset faster than for other configurations, because the $COMP_i$ line does not have to be pulsed. Both the pixel configuration of FIG. 10D and that of FIG. 10C are particularly well-suited for low-end applications, such as toy cameras, where the pixel analog value need be quantified to only a small number of bits. For high-end applications the non-linear effects associated with these pixel designs may degrade image quality below an acceptable level.

Figure 10E:
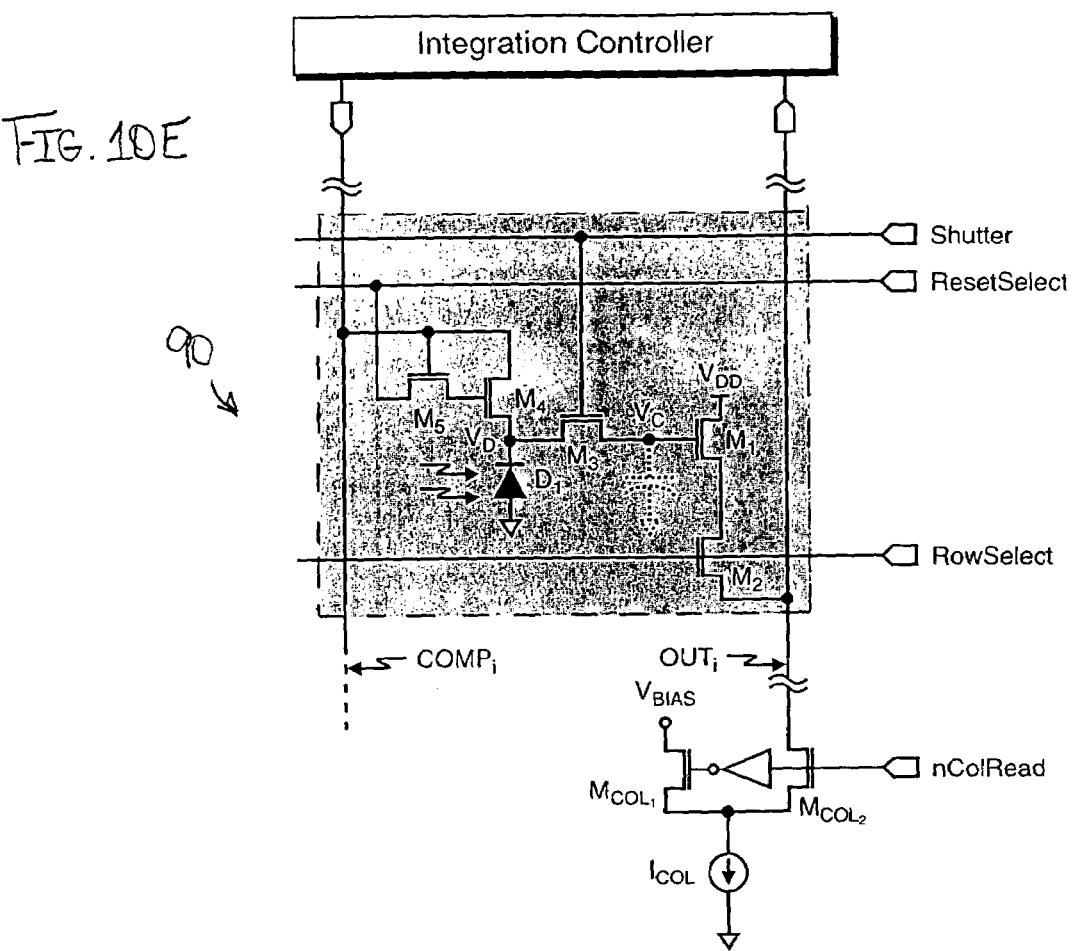

FIG. 10E presents a final example pixel configuration 90. This configuration is quite similar to that of the pixel of FIG. 9A, with an adaptation that the ResetSelect line is pulsed to turn on and off the pixel transistor $M_4$, while the $COMP_i$ line is set to a high state or a low state only once, depending on the reset decision made, during a pixel reset cycle. When the ResetSelect line is in the low state the pixel cannot be reset; the $COMP_i$ line might move to a high state, causing the pixel transistor $M_5$ to turn on but maintaining the pixel transistor $M_4$ biased off.

When ResetSelect is at a high state, the pixel is reset when the $COMP_i$ signal is also at a high state. In this state the pixel transistor $M_5$ turns on, acting as a pass transistor, and the pixel transistor $M_4$ also turns on, resetting the pixel. After the pixel photodiode has charged up, the $COMP_i$ signal must be maintained in a high state to maintain the pixel transistor $M_5$ on while ResetSelect must be set to a low state to turn off the pixel transistor $M_4$.

For some applications, this pixel design may not be preferred due to the complexity required to produce a configuration for a bi-directional reset path to achieve a lag-free pixel reset. But for area-constrained imager applications, the design can be preferred as it achieves a lag-free reset without the need for additional a ResetPulse control signal. If lag-free pixel reset is not required, this pixel configuration can also be attractive because the reset requires only one transition of the $COMP_i$ line, and as the line that is pulsed is the ResetSelect line, an imager array having more rows than columns can be efficiently implemented with a larger dynamic range increase factor.

Referring back to FIG. 1, whatever pixel configuration is selected, it is provided, in accordance with the invention, in a pixel array 12 having m columns and n rows of pixels. As explained earlier, there is further provided in the imager system a memory array 24 having the same number, m, of columns and having a number, k of rows, where k preferably equals n. The integration controller 20 of the imager system employs the memory array 24 to carry out the integration control method of the invention described above.

Expression (5) above defines the digitized output value, $d_D(I)$, of a pixel at the end of a total integration period as being a function of the number, m, of the integration slot for which the pixel was last reset, and $Q(I)$, which for the CMOS voltage-output pixel of FIG. 9A is $V_D$.

Each memory cell in the memory array is preferably assigned to a corresponding and distinct pixel in the pixel array for storage of the value of m in expression (5) above for that pixel as a pixel array integration period and its various integration time slots progress. Because the illumination range of each pixel is independently controlled, such that no particular integration slot is imposed globally on the pixel array as a whole, pixel-specific integration status storage is required.

For the example given above where the integration slot duration ratio is constant for an entire integration period, enabling expression (5) to be simplified to expression (6) for scaling digitized pixel values, the m value stored in the memory cells is employed directly for the scaling operation. If the integration slot duration ratio is not constant, then the more general expression (5) is employed to scale the digitized pixel values. For this scenario, a global lookup table is provided that stores the values of $J(0), J(1), J(2), \ldots J(M)$. The value of m stored in the memory cells in this case operates as an index to the lookup table to retrieve needed values of $J(m)$ to generate the scaled pixel output value.

Figure 11:
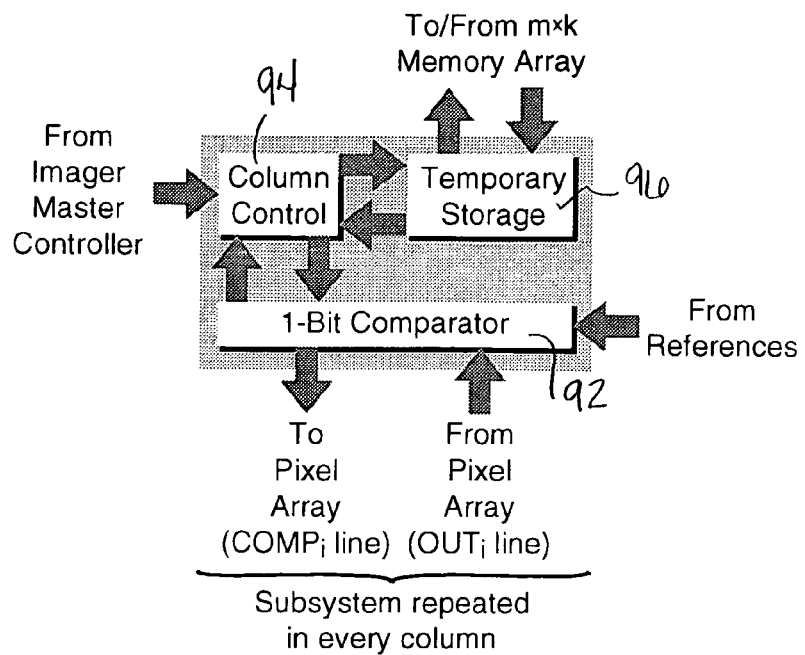
FIG. 11 is a block diagram of the imager system integration controller provided by the invention.

The integration controller implements in hardware the integration control method of the invention, relying on the memory array for specific pixel integration status data. FIG. 11 is a block diagram of the component systems of the integration controller 20. The integration controller provides, for each column of the pixel array, a comparator 92 for making pixel voltage checks during an integration slot; a column controller 94 for controlling the comparator and for memory content and $COMP_i$ line management; and temporary storage 96 for storing pixel-specific data fetched from the memory array.

The integration controller conducts control of the pixel integration based on further a counter provided by the imager master controller, shown in FIG. 1, the output of the counter being by each of the column-specific comparator, control, and temporary storage blocks across the pixel array. The counter can alternatively be configured as in each integration controller. The counter provides a current and running indication of the number of pixel voltage checks that have been carried out during a given integration period. The counter value is zero at the start of an integration period, is set to one when the first pixel check is made, and so on. This counting technique provides a means for updating the m value of a pixel based on a saturation prediction check for the pixel, as explained below.

Figure 12:
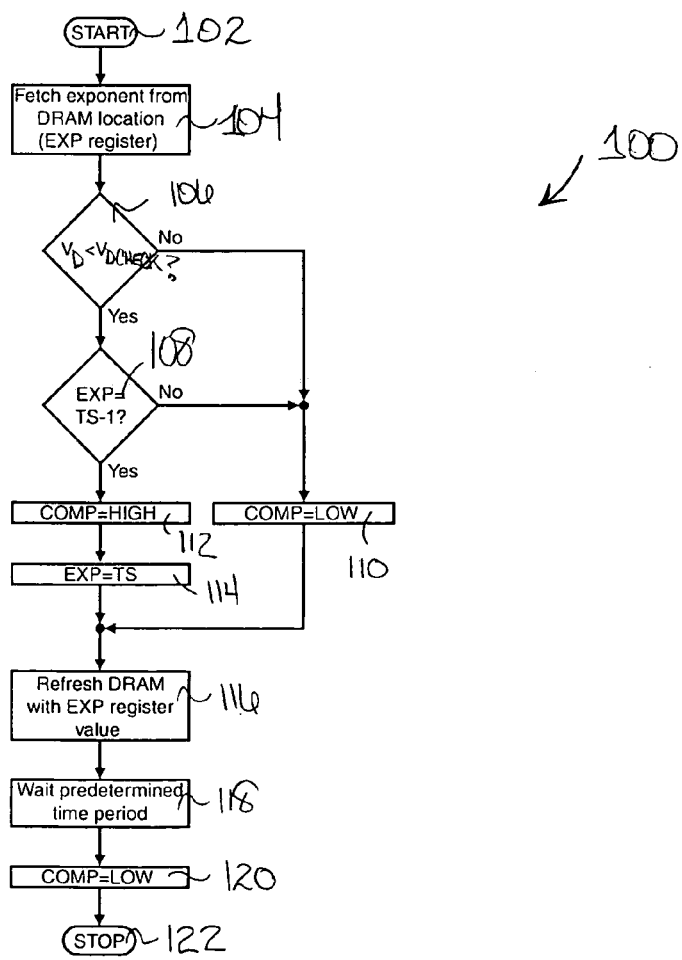
FIG. 12 is a flow chart of the integration control method of the invention as-implemented by the integration controller of FIG. 11.

The flow chart of FIG. 12 provides a method 100 by which the integration controller carries out the integration control of the invention. The method is started 102 as an integration slot is begun for a pixel array. Then, the method is iteratively carried out for each pixel check time during the integration period. When a check of the value of the pixel output voltages is to be made, the contents of the location in the memory array associated with a pixel that is being checked are fetched 104 and placed in the temporary storage block (the EXP variable in the flowchart) 96 while the $OUT_i$ line of the pixel settles to the pixel output voltage, $V_D$, minus all offsets from the source-follower amplifier during the Comparison Phase of the pixel described above. For pixel designs not employing a source follower amplifier in the manner of the design of FIG. 9A, in general, the $OUT_i$ line of the pixel settles to some value that is a known function of $V_D$, say, $g(V_D)$. The contents of the memory are defined to be the value of m, the number of the last integration slot for which the pixel was reset to begin integrating, as explained above. The temporary storage can be provided as a read/write register that is as wide, e.g., in number of bits, as the pixel value of m.

After this fetch and storage, the comparator 92 is enabled to compare 106 the pixel voltage value, $V_D$, with the specified voltage check value, $V_{D,CHECK}$, defined above based on either expression (3a) or (3b). For the general pixel design described just above, where the $OUT_i$ line of the pixel settles to some value that is a known function of $V_D$, say, $g(V_D)$, the voltage check value would be given as $g(V_{D, CHECK(i)})$. The output of this comparison is directed to the column controller 94. If the comparison indicates that the pixel is going to saturate, or has saturated, the column controller 94 accesses the current value of the counter (TS) 98, which is accessible by all column controllers through, e.g., a common bus, and compares 108 the counter to the value in the temporary storage (EXP) 96.

If the stored exponent (EXP) differs from the counter value by more than one unit, then the pixel of interest was reset two or more integration slots prior to the current slot, and although its voltage value may be predictive of saturation, it will not saturate, as explained earlier. For this case, the $COMP_i$ line of the pixel is set 110 to a low state, and the value of the temporary storage block is maintained, to indicate that no reset of the pixel is being carried out. If the stored exponent (EXP) is one less than the current counter value (TS), then the pixel of interest was reset at the most recent integration slot commencement so should be reset due to its predicted saturation. Here, the $COMP_i$ line of the pixel is set 112 to a high state, and the current value of the counter, TS, is stored 114 in the temporary storage block.

The memory cell associated with the pixel of interest is then refreshed 116 with the value in the temporary storage block, and thus is either updated with a new value or refreshed with its previous value. The $COMP_i$ line is held 118 at its current state for a predefined time period, and then is set 120 in a low state. This allows enough time to pass so that the pixel is reset, and then discharges the gate of the pixel transistor $M_4$, in FIG. 9A, as explained earlier to turn off this transistor. With this last step, the method 100 is completed 122 and a new integration slot is begun.

Two additional signals, HardReset and MemoryClear, are passed from the imager master controller to the column controller of the integration controller. The HardReset signal is employed to force a "hard" pixel reset, i.e., a pixel reset regardless of the pixel value, without regard to a saturation prediction check, on the entire pixel array at the start of a new frame and its integration period. The MemoryClear signal is employed to zero out the contents of the memory array at the start of a frame and its integration period. When the HardReset signal is set to a selected level, e.g., a high state, the column controller of the integration controller disables the comparator and sets the $COMP_i$ signal to a high state. Similarly, when the MemoryClear signal is set to a selected level, e.g., a high state, the column controller stores a zero value in the temporary storage register.

Figure 13:
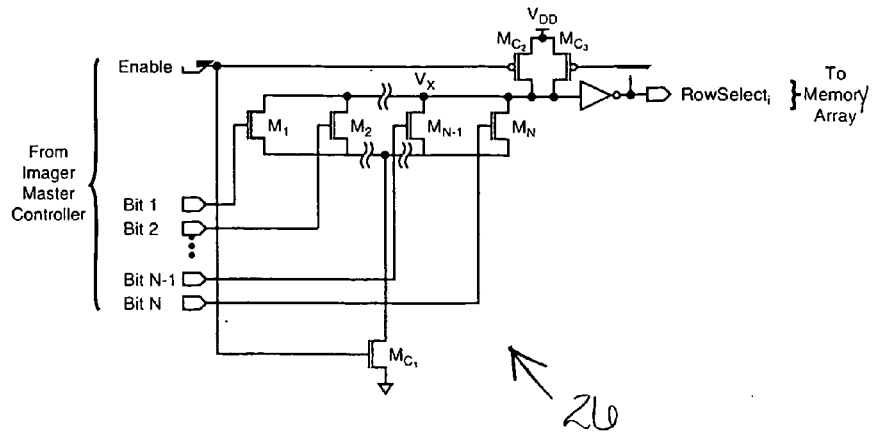
FIG. 13 is a circuit diagram of the imager system memory controller provided by the invention.

The pixel array controller 22 and memory controller 26 enable the integration control method that is implemented by the integration controller. An example implementation of a memory array controller 26 provided by the invention is diagrammed in FIG. 13. This example is a dynamic logic implementation, with an adaptation that the Clock signal is in this case employed as an Enable signal, which is provided by the imager master controller, as explained in more detail below. Note that the pixel array row number, binary coded into bit N to bit 1, also is provided by the imager master controller. The word-line driver can be as simple as a digital buffer, inverters, as shown, or other suitable configuration. Also note that when the row number is zero, no row is selected.

The process of accessing a selected memory cell row is carried out by first inputting the selected row number, after which sufficient decoder bit line settling time is provided. The memory controller is then enabled. As in traditional designs, the memory controller transistor $M_{C3}$ is a small (in size) PMOS transistor, which is usually called a "keeper," whose function is to keep the node $V_X$ at a high state when the decoder is not enabled. This transistor and the NMOS transistors of this dynamic NOR gate are preferably sized such that when any number of NMOS transistors are on, the node $V_X$ will be essentially grounded; the NMOS transistors are thus preferably specified to be much larger (in size) than the PMOS keeper.

Figure 14A:
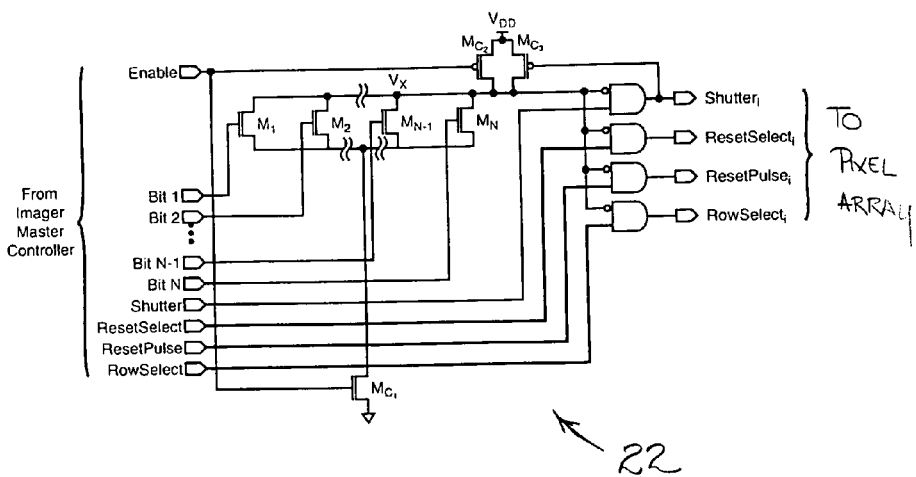
FIG. 14A is a circuit diagram of the imager system pixel controller provided by the invention.
Figure 14B:
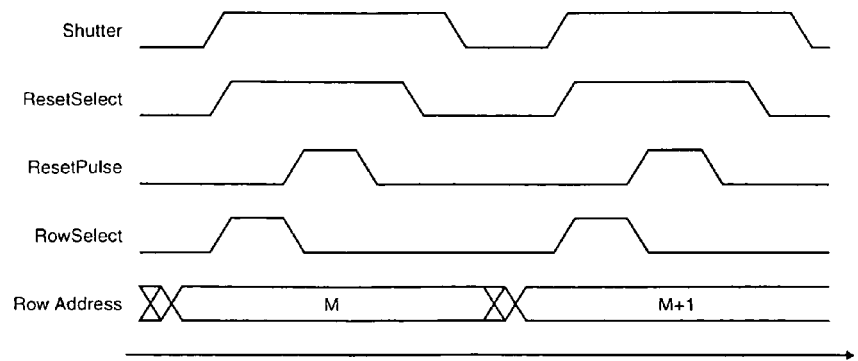
FIG. 14B is a timing diagram of the signals employed in operating the pixel controller of FIG. 14A.

FIG. 14A provides an example implementation of the pixel array controller 22. This decoder is similar to the memory array controller. Here, however, there are provided a number of AND gates after the dynamic NOR gate, replacing the inverter of the memory controller. This adaptation enables the use of the NOR gate as a general row selector, while the AND gates generate the necessary signals for the row. The imager master controller provides the row number, binary coded into bit N to bit 1, the enable signal, and the pixel control signals described above, namely, the ResetSelect, RowSelect, ResetPulse, and Shutter signals. Synchronization of all of these signals is attained in accordance with the invention by generation of all of the signals in a single timing unit, provided as a signal generator of the imager master controller, described below. The signals can be viewed as clocks of different frequency and duty cycle, as shown in FIG. 14B, and as described further below.

The cells of the memory array 24 of the imager system can be implemented in any of a range of configurations. For example, an analog memory cell can be provided as a capacitor that stores an analog pixel voltage or charge value. A digital DRAM cell can be provided as, e.g., two capacitors with corresponding pass transistors, having a differential architecture. A digital SRAM cell can alternatively be provided, as, e.g., a pair of cross-coupled digital inverters with corresponding pass transistors. The memory array can be sized to accommodate more than the required pixel scaling factor, e.g., being sized to accommodate post processing, e.g., color processing of image data.

It is not generally preferred in accordance with the invention to employ an analog, on-pixel memory configuration. An analog memory requires increased pixel size, resulting in either a significant increase in the area of the pixel array or a significant decrease in the pixel fill factor for a given pixel area, where the fill factor of a pixel is generally given as the ratio of the area of a pixel photodiode to the total area of the pixel. In addition, the photogenerated charges that originate in the semiconductor substrate region of the pixel array can diffuse lengths that are typically much larger than the pixel width or length. Such charges could reach a storage capacitor junction in the pixel and alter the stored voltage of the capacitor. This may not pose a severe problem for an imager system and integration control method requiring only a few pixel checks due to a relatively moderate dynamic range expansion requirement, but is a critical detriment for any practical dynamic range increase. It can be argued that increasing the capacitor magnitude might solve this problem, but then the array area/pixel fill factor problem mentioned above worsens.

Assuming a digital memory array, typically more than two bits of memory are required to accommodate an integration control method that produces a substantial dynamic range increase. If two or more DRAM or SRAM cells were to be integrated into a pixel cell, with or without a sensing amplifier, the array area or pixel fill factor would be unacceptable for most applications. In addition, the voltage value corruption described above due to migration of photogenerated charge in the semiconductor substrate disfavors any memory storage in the image array region of a semiconductor substrate. Consequently, it is preferred that the memory array, whether analog or digital, be configured separate from the pixel array to maximize spatial resolution of the imager and to minimize storage errors.

It is therefore preferred for most applications that the memory array be implemented digitally, as DRAM, SRAM, or other digital configuration, and outside the pixel. Assuming that the imager system includes ADC(s) integrated on a common imager chip, if the memory array cell is analog, the memory contents have to be digitized before the final pixel output can be produced. In one configuration, the ADC(s) employed to digitize the pixel output are also employed to digitize the analog memory values, and in most cases this/these ADC(s) will be linear. Dedicated ADC(s) for analog memory conversion would increase the chip area and power consumption substantially over that of a system employing digital memory. If only a few ADCs are required for the pixel array of the imager, then adding extra converters for the memory might be viable but for many applications this would mean adding a substantial number of converters just to digitize the memory contents. Therefore, it is a good assumption that a system with analog memory cell implementation employs a common ADC array to digitize both the pixel and memory contents. But this arrangement significantly decreases the frame rate, or, if the frame rate is fixed, then the arrangement significantly increases the power consumption of the imager. As a result, it is preferred in accordance with the invention that the memory be implemented as a digital cell configuration.

The memory configuration preferably provides a memory cell access time that is shorter than the time required to activate a row of pixels in the pixel array, to ensure that the speed of the integration control method is not limited by access of the memory. If a fabrication process is developed that renders pixel row activation time negligible, then the dynamic range expansion produced by the integration control method will be partly determined by the memory access time. In this case, the memory access time should be as fast as necessary to achieve a specified dynamic range expansion. Similarly, the memory write time is preferably shorter than the time required to reset a pixel in the pixel array. If a fabrication process is developed to produce a substantially negligible pixel reset time, then the memory write time should be as fast as necessary to achieve a specified dynamic range expansion.

As explained above, the parameters of the integration control method of the invention are user-programmable and can be user-adjusted from frame to frame in real time. Referring to FIG. 1, the user interface 14 implements a configuration for this user control of the imager system. One example implementation of the user interface 14 is illustrated in the block diagram of FIG. 15. The user interface includes a communication port 130 that receives and transmits user-defined system configuration information, employing a prespecified communications standard. For example, a serial standard such as RS232C, I2C, or USB can be employed, or a parallel standard can be employed. Hardware for the transceiver, including buffers, is preferably located in the communication port. To enable user-specification of parameters on a frame by frame basis, it is preferable to provide a corresponding arrangement, e.g., a double buffer arrangement, or a corresponding protocol, e.g., a handshake protocol, to ensure that user-supplied parameter data is accepted prior to the start of a relevant frame.

Operational system parameters that can be specified by a user include the imager frame rate; the desired dynamic range increase factor, K, to be produced by the integration control method; the ratio, B, whether a constant or changing, between the duration of successive integration slots to be employed during an integration period; the window of pixels of interest within the pixel array, specified by a number, ROWS, of pixel rows and a number, COLS, of pixel columns, and the offset of this window from, e.g., the top left corner of the pixel array; the total number, R, of pixels to be read for producing image data; the ADC resolution, N; a preferred output format, e.g., serial or parallel, frame rate, and the implementation of correlated double-sampling.

The user-specified values for these parameters are stored in configuration registers 132 that can be accessed by the imager master controller. Preferably, these registers are read by the imager master controller before the start of each frame, given that the parameter values can be selectively adjusted by a user from frame to frame.

Note the distinction between parameters designating a window of interest in the pixel array to be employed for producing images and a parameter designating the number of pixels from the array to be employed. If the number, R, of pixels specified is equal to the pixel number of the product, ROWS×COLS, then the pixels in the specified window are read out once during a frame. If R>ROWS×COLS, then it is be possible to read some pixels within the defined window more than once for a given frame; and if R<ROWS×COLS, then not all pixels in the specified window are read for a given frame.

Figure 15:
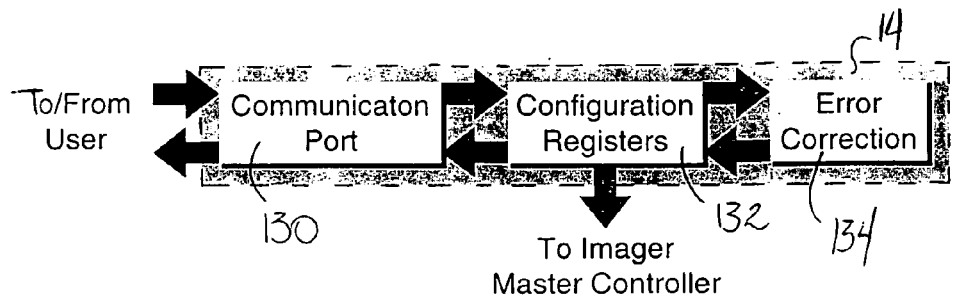
FIG. 15 is a block diagram of the imager system user interface provided by the invention.

As shown in FIG. 15, data communication between a user and the imager system user interface is preferably bi-directional, so that a user can retrieve the imager configuration values currently set for the system. This feature can be especially useful for validating the correctness of the parameter values stored in the configuration registers 132.

An error correction block 134 can additionally and optionally be provided to automatically read the values of the registers, check their validity, and write back to the registers any necessary corrections. The relationship to be satisfied by the register set is given as:

$$\frac{\frac{1}{f} - G(R) \cdot (T_{CO} + n \cdot T_{BIT} + COF \cdot PCDS \cdot T_{CDS})}{T_{INT,MIN}} = J(M), \tag{13}$$

where G(R) is the number of conversion cycles required to digitize a set of R pixels, COF=1 if the correlated double-sampling subsystem is employed, COF=0 if the correlated double-sampling subsystem is not employed, PCDS is the number of phases required to perform the CDS operation, $T_{CDS}$ is the settling time of the opamps employed in the CDS operation, $T_{CO}$ is the column overhead time, dominated by the column source follower amplifier settling time, and $T_{BIT}$ is the opamp settling time.

This generalized expression (13) enforces a condition where for any programmed imager options, the maximum dynamic range expansion characteristic of the integration control method of the invention, as given in expression (8) above, holds for the imager system. The error correction block 134 can be implemented to provide a check of user-specified operational parameters to ensure that this condition is met. In one example implementation, a set of default register settings is provided that are employed when it is determined by the error correction block that a user-specified parameter value causes an error.

Figure 16:
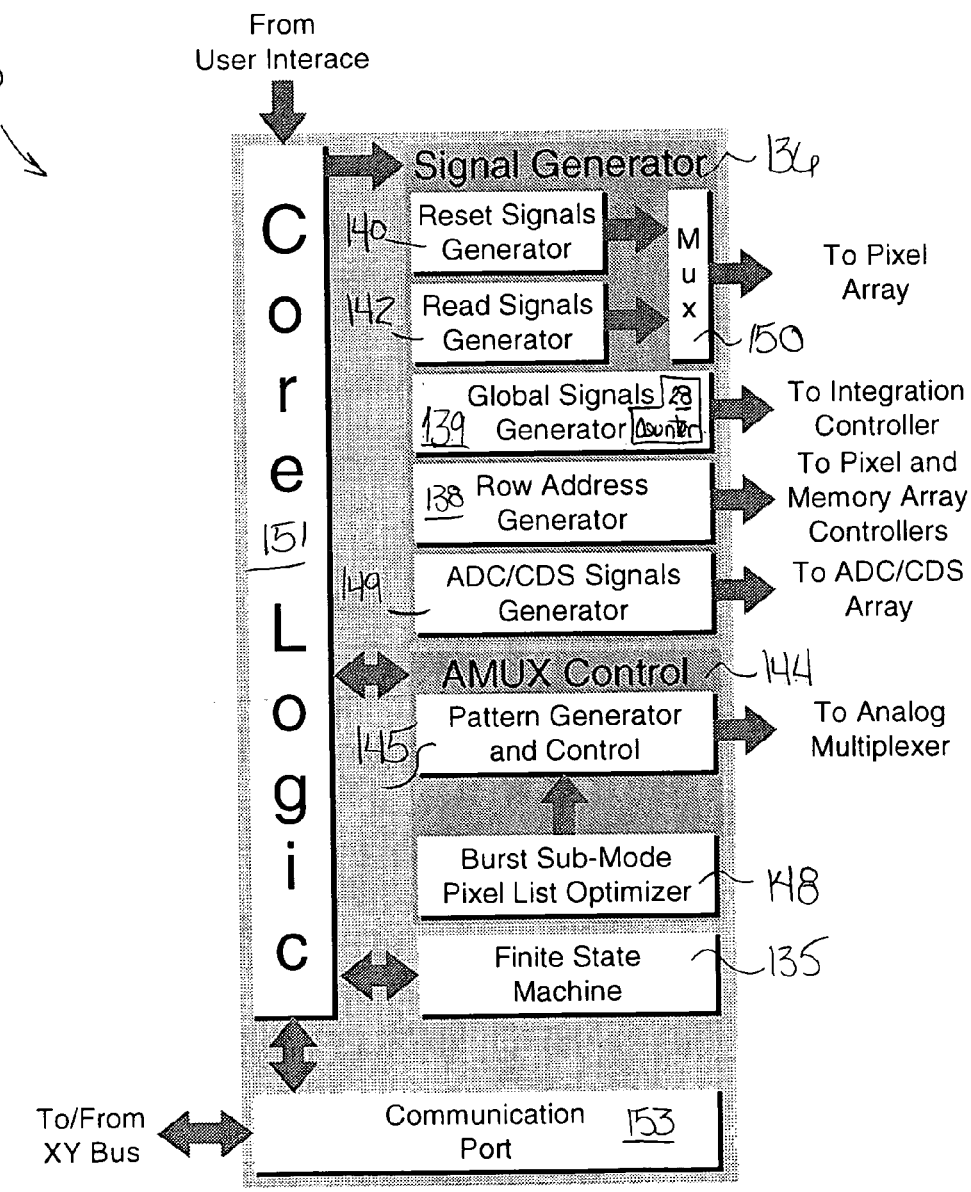
FIG. 16 is a block diagram of the imager system imager master controller provided by the invention.

As just explained, the imager master controller accesses the user-specified operational parameter values and controls the other imager subsystems based on these values. The imager master controller operates in any of four main states, namely, an Idle State, an Imaging State, a Reset Scan State, and a Read-Out State. Referring to FIG. 16, which is a block diagram of an example imager master controller 18, a finite state machine 135 is provided for setting the operation of the controller in one of these defined states. In one example configuration, the imager system is provided with two major modes, a continuous imaging mode and a single frame mode. In the continuous imaging mode the imager master controller continually cycles between its Imaging and Read-Out states. In the single frame imager mode, cycling between the Imaging and Read-Out states is performed only once.

The imager is in the Idle state when it is not imaging or reading out the values of the pixel array. This condition can occur, for example, when a user is re-programming the system or allowing the duration of a frame or more to pass as user-specified parameters are determined, as explained above, when there is no need to image a scene, or after a frame has been read out when the imager is operated in the Single Frame mode. In the Idle state, all of the subsystems of the imager system, except the user interface and the imager master controller itself, can be "deactivated" to save power.

In the Imaging state the imager master controller is idle while the pixel photodiodes collect photogenerated charges, but there is a running counter, corresponding to the integration controller counter, as described above, that indicates when a pixel saturation prediction check should be performed. This counter preferably includes a programmable delay to accommodate the user-definable, variable the relationship between integration slot durations; and to accommodate the condition where the delay between checks gets shorter from one check to the next, as each succeeding integration slot is shorter.

Referring to the block diagram of the imager master controller in FIG. 16, during the Imaging state, when the counter indicates that a pixel saturation prediction check should be performed during an integration slot, a pixel array signal generator 136 and its sub-system, a row address generator 138 are started. Note that the row address generator output goes to the input of both the memory array control and the pixel array controllers. The imager master controller here also provides a CheckEnable signal, generated by a global signals generator 139, that is passed globally to the integration controllers to initiate the saturation prediction check for each row of the pixel array. The signal generator also here generates the nColRead signal to switch the current source at the bottom of the each column of the pixel array in and out of the column, to complete the circuit elements needed to form the source-follower amplifier, as described above with regard to the pixel configuration.

The Read-Out state includes two sub-modes, the first of which is a Window sub-mode, in which the imager master controller controls digitization of pixel values for a user-defined window, to produce the binary output for each pixel in the window. The second sub-mode is a Random Access sub-mode, in which the user provides a succession of X-Y pixel coordinates in the manner described above and the imager master controller controls production of the binary output for the requested pixel or pixels. In a first Random Access sub-mode, the Immediate mode, a user inputs the address of a pixel of interest and the imager master controller immediately produces a digitized value for the selected pixel. In a second Random Access sub-mode, the Burst mode, a user inputs a list of addresses of pixels of interest and the imager master controller produces an output of digitized pixel values for the entire list of pixels.

If the imager master controller is in the Read-Out state, and the imager system is operating in Continuous Imaging mode, then a user can read a maximum of R pixels within the defined pixel window, as defined above, before the imager master controller disables the X-Y address bus and starts imaging the next frame.

In either case, to generate the pixel output values, the reset signals generator 140 and the read signals generator 142 of the imager master controller access a pixel row and associated memory locations. The memory contents are directed to the output interface subsystem, as described below, and the pixel data is directed to the digitization blocks, also described below.

The particular output of the read signals generator 142 depends on whether or not a user specified the use of correlated double sampling (CDS). If such was specified, then the read signals generator holds every single control line associated with the pixel row in a low state, except for the RowSelect signal, which is pulsed to a high state to read the photodiode voltage. If the CDS option was selected, after this RowSelect signal pulsing the pixel is hard reset and read again.

The ADC selector control 148 controls the analog multiplexer of the imager system, described below, which maximizes the utilization of the ADC array, also described below. This block takes either the pixel list or the pixel window definition, both provided by the user, and generates patterns of 1s and 0s to be loaded to the shift register of the analog multiplexer. An AMUX control subsystem 144 is provided, including a pattern generator and controller 146 for controlling the operation of the AMUX shift register including its loading and subsequent pattern shifting.

When the number of pixels in the specified window is not equal to the value R, then the user provides to the imager master controller, as shown in FIG. 1, a list of pixel locations to be read. The user does not need to provide a list of R pixel addresses, however. Instead, the imager master controller provides the user with a clock signal that can be employed as a PixelValidate signal; that is, the imager master controller reads an input pixel address at the rising, or if desired, falling, edge of the PixelValidate signal. If a user wants to read a pixel, he inputs the address before the edge of the signal, and the imager digitizes and outputs the requested pixel value. A pixel address input of zero can be employed to specify that no pixel is to be read for a given frame, the imager instead waiting at idle until the until the next edge of the PixelValidate signal, continuing until R PixelValidate cycles have been completed. This allows a user the flexibility of time to determine a new set of pixel addresses of interest without unnecessary imager operation.

If the system is set to operate in the second Random Access sub-mode, the Burst mode, where a user specifies a particular pixel window of interest and provides a pixel list to be employed, the restrictions on the layout of the imager system multiplexer, described below, create a situation where the order in which the pixels are read can make a significant difference in terms of the number of conversion cycles needed to scan the whole pixel list. Consequently it can be preferable to employ an optimization routine which for a given pixel list, produces the optimal order in which the pixels should be read to maximize efficiency. A burst sub-mode pixel list optimizer 148, including cache memory, can be provided in the AMUX control block 144 of the imager master controller for mapping a software optimization routine into hardware for performance by the imager system on-chip. The cache memory size, and area can be expected, for some applications, to pose a limit to the length of a pixel list can be, thus upper bounding the total number, R, of pixels to be read. In this case, the X-Y bus is preferably bi-directional because the user provides the "unsorted" list, and the chip optimizes it and digitizes the pixels, but the user then does not know in which order the pixels are being digitized and output, so together with the pixel binary values the chip would have to output the sorted pixel list.

Finally, the ADC/CDS signals generator 149 produces the different phase signals required by the converters and correlated double-sampling circuits. In terms of which converter to use, the integration control method of the invention does not impose any particular architecture, but in terms of the programmability of the system, a known and controllable precision, defined as the ratio of the number of bits to the conversion time is preferred. If this is not the case, the ADC precision option is preferably not one of the user-definable parameters.

The imager master controller further includes core logic 151 for enabling the sub-systems of the controller, based on parameter values provided by the communication port and the user interface. For example, where the user interface requests pixel read out in a Burst mode, the core logic enables the List Optimizer sub-system. The core logic also configures the signal generator to produce the signals required of specific imager modes. Such mode information can be passed through the user interface to the imager master controller, e.g., as an extra configuration register. The communication port 153 of the imager master controller enables communication to the other subsystems of the imager system by way of, e.g., an XY bus.

The imager system of the invention employs an analog-to-digital converter, e.g., a variable-to-fixed analog multiplexer 150 (AMUX) The AMUX is preferably provided between the pixel array 12 and the ADC array such that an ADC is not required for each and every column of the pixel array. FIG. 17 provides a diagram of an example AMUX employed in accordance with the invention.

In one preferable AMUX configuration, as shown in FIG. 17, any pixel column can be connected to any available ADC, to maximize the number of pixel columns from which pixel data can be digitized simultaneously. This flexibility enables multiplexing as well as full column-parallel processing based on the user-specified number of pixels and pixel window of the pixel array that is to be employed for a given frame, in general when $R \leq A$, the number of available ADCs. The AMUX provides an arrangement of switches that resembles a read-only memory (ROM), as a given pixel column is always associated with the same ADC.

A selected pixel column, c, is associated with a selected ADC, a, out of a number, A, of available ADCs, as:

$$a(c) = 1 + |c-1| MOD\ A; \qquad (14)$$

where the leftmost pixel column is identified by c=1. A shift register 152 having a number of stages corresponding to the number of columns in the pixel array is provided to achieve smaller area and greater flexibility than would be had for a typical ROM design decoder. The stage outputs of the register 152 indicate which columns are to be digitized. Because the shift register can be preset to any binary word, then if $C = \{c_1, \ldots, c_A\}$ is the set of column numbers, whether or not contiguous, of the pixels to be digitized, regardless of the row or rows in which the pixels are located, then the pixels can be digitized simultaneously, provided that $|c_i-c_j| MOD\ A \neq 0$, with $i \neq j$, i, j=1,2, ..., A. This restriction comes from the fact that if there are A ADCs provided in the system, then every other $A^{th}$ column shares a converter.

Referring to FIG. 18A, there can optionally and preferably be included in the imager system a correlated double-sampling subsystem 28 (CDS) for reducing fixed-pattern noise in output pixel values. This noise reduction is here achieved by subtracting the pixel output values after pixel reset from pixel output values produced at the end of an integration period. The CDS also can be employed to convert the single-ended output value of a pixel to a differential signal.

FIGS. 18B–D provide the timing diagrams for the CDS operation. At the end of an integration period, the RowSelect signal of a pixel to be read-out is set to a high state. At the same time, the SAMPLE1 signal is set to a high level. The resulting circuit formed by the CDS is shown in FIG. 18E. After the column line voltage for the pixel, $V_D(t_1)$ and the op-amp signal $V_{OUT}$ have settled to the required accuracy, the SAMPLE1 line is set to a low level. The feedback switches $M_9$ and $M_{10}$ are preferably timed to open slightly before the other switches clocked on the SAMPLE1 signal, such that clock feedthrough is reduced.

At this point, the SAMPLE2 signal is set to a high level. There is no specific delay required between the falling edge of SAMPLE1 and the rising edge of SAMPLE2, but the two clocks must not overlap. The resulting CDS operational configuration at this point is shown in FIG. 18F. After the column line voltage $V_D(t_2)$ and the op-amp output have settled, the ISOLATE line is set to a low level, isolating the CDS circuit from any change in potential on the column line. The resulting CDS operational configuration is shown in FIG. 18G.

The resultant output voltage is produced by equating the charge stored on the summing nodes before and after the SAMPLE1 phase. The output voltage is then given as:

$$V_{OUT} = (V_{CM} - V_{OS}) + (V_D(t_2) - V_D(t_1)). \qquad (15)$$

The common mode voltage, $V_{CM}$, together with the offset voltage, $V_{OS}$, can be set so that the output is within the specified range of the ADCs.

Figure 19:
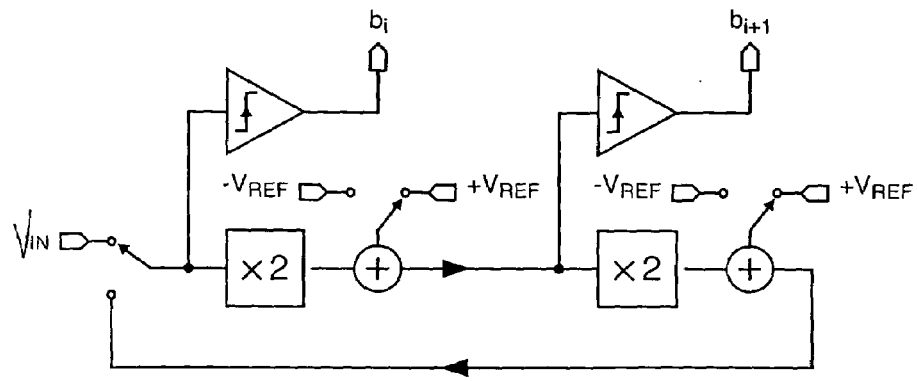
FIG. 19 is a circuit diagram of the imager system cyclic analog-to-digital converter provided by the invention.

An example cyclic ADC 160 that can be employed in the ADC array 30 of the imager system of the invention is diagrammed in FIG. 19. Conversion is carried out by first sampling the input voltage, $V_{IN}$. The input range is specified, e.g., as being between −1 V to +1 V. The input voltage value is compared to zero to produce a most significant bit, $b_0$; $b_0$ is of value 1 if the input voltage value is positive, and is 0 if the input voltage value is negative. The input is then doubled, and the value of $-V_{REF} = -1$ V is added if the value of $b_0$ is 1, while the value of $V_{REF} = 1$ V is added if the value of $b_0$ is 0. In either case, the analog output, or residue, from the first stage, is between −1 V and +1 V.

The second stage of the converter performs the same operation, but here taking as the input the residue of the first stage. The second stage then produces the value of next most significant bit, $b_1$. The first stage samples the residue of the second stage, to produce the value of the third bit, $b_3$. This cycle continues until the values for the specified number of bits is obtained. The time required to complete one conversion is therefore directly proportional to the total number of bits desired. ADC resolution can be traded for conversion speed, where necessary.

Figure 20:
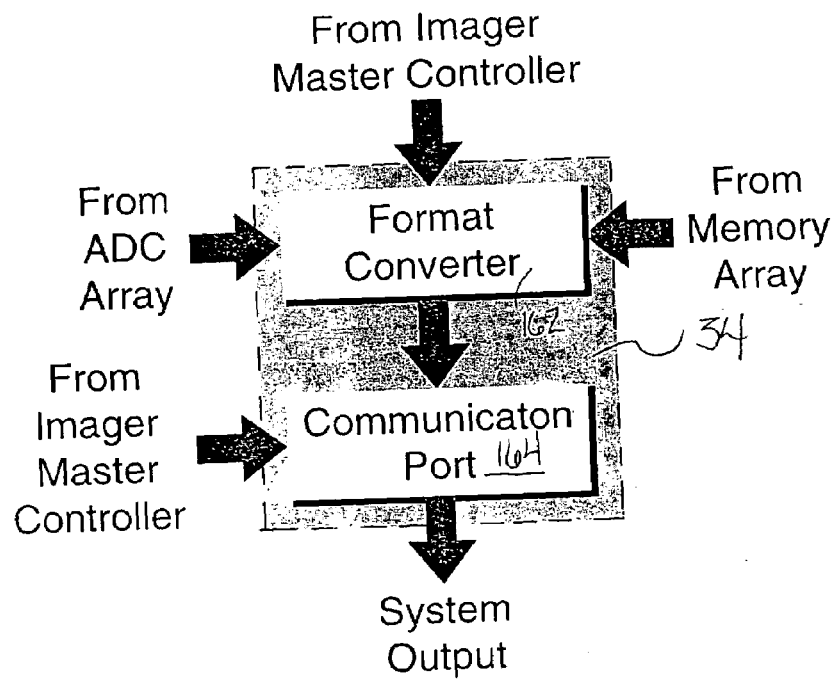
FIG. 20 is a block diagram of the imager system output interface provided by the invention.

The digitized result produced the by ADC array of the imager system is passed to the output interface 34 shown in FIG. 1. FIG. 20 provides a block diagram of an example output interface implementation. The output interface includes a format converter 162 and a communication port 164. Digitized pixel value data from the ADC array and pixel-specific integration data from the memory array is supplied to the format converter. Specifically, the format converter formats a digitized pixel value based on the integration slot number at the memory location associated with that pixel. The format is determined based on control from the imager master controller, which passes the format information from the user interface, as explained above.

Example formats include floating point, where the pixel value mantissa and the memory value are transmitted separately or a "straight binary" representation of the total pixel output. For this format, if Q is the digitized pixel value, and m is the memory value, with a user-defined relationship between the duration of successive integration slots given as J(m), then the system pixel output, O is given as:

$$O = Q \cdot J(m). \quad (16)$$

If the integration slot duration ratio is constant over an integration period, then this expression simplifies to $$O = B^{m-1}. \quad (17)$$

To enable this output format, the format converter requires a multiplication unit. If $J(m) = B^{m-1}$ and B is a power of two, this unit can shift the value of Q to the left as many binary digits as necessary, assuming the ADC value is coded in binary form, as is conventional. If B is not a power of two, or if $J(m) \neq B^{m-1}$, then a more sophisticated multiplication unit is required. The invention is not limited to these particular output formats; for a given application, it is preferred that the most convenient format be selected.

Figure 21:
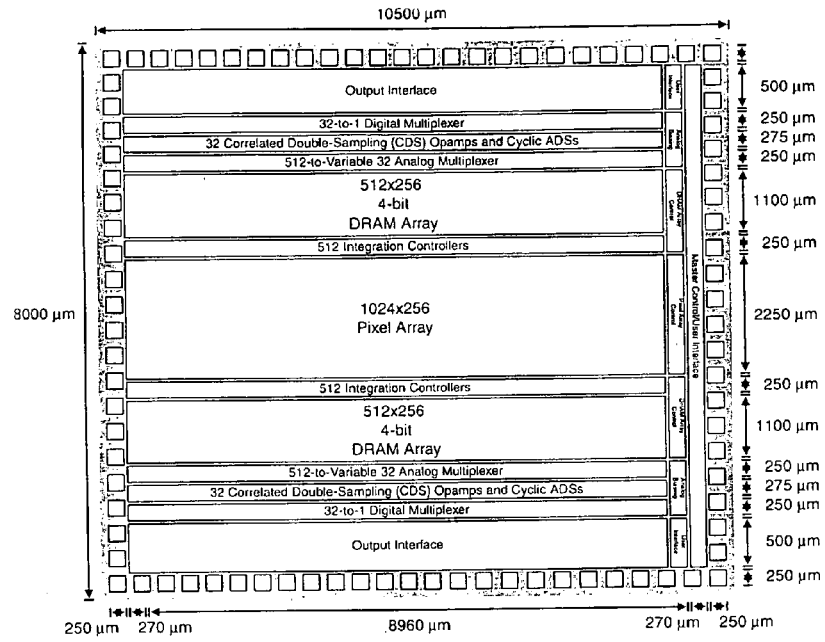
FIG. 21 is an example monolithic layout provided by the invention for the imager system.

The communication port 164 of output interface is configured in a manner similar to the communication port of the user interface, in that it operates based on a specified communication standard, such as RS-232, I2C, USB, parallel, or other standard, to transmit the formatted pixel output. For most applications, the communication port of the output interface need be transmit-only. Preferably, all of the hardware for the transmitter, including output buffers, is located in this port. As explained above, the imager master controller commands the start and stop of the output transmission. FIG. 21 is an example layout for the monolithic integration of all of the subsystems of the imager system. This example is based on a 0.35 μm CMOS process. A 1024×256 pixel array and 2 512×256 4-bit DRAM arrays are included. This example layout provides a top and bottom distribution; i.e., the memory, ADC, CDS, and AMUX arrays, together with the digital MUX and the output interface, have been split in two. This is preferred for providing each array with twice as much width on the die, maximizing area-efficiency of the layout.

The imager system of the invention is particularly flexible in that all of the relevant user-definable parameters, namely, number of pixels employed, R, the frame rate, f, the desired dynamic range increase factor, K, and the resolution of the ADC array, are set by timing signals. The ADC conversion time is a function of the conversion bit precision, n, desired, as explained above, with N set as the maximum number of bits. The ACD conversion time, $T_{CONV}$, is given as:

$$T_{CONV} = T_{CO} + n \cdot T_{BIT} + COF \cdot PCDS \cdot T_{CDS} \quad (18)$$

The frame rate sets the maximum time between quantizations of the same pixel row, $T_Q$, as the time duration for a frame includes a light integration time, $T_{INT,MAX}$, and a read time, $T_{READ}$, during which pixels in the pixel array can be randomly accessed and digitized. The read time is a multiple of the conversion time, and is given as:

$$T_{READ} = G(R) \cdot T_{CONV} = G(R) \cdot (T_{CO} + n \cdot T_{BIT} + COF \cdot PCDS \cdot T_{CDS}), \quad (19)$$

The minimum value of R is 1 because the integration period continues even if no pixels are read. Then the maximum possible time between pixel value quantizations for pixels in a common row can be considered to specify the maximum required integration time, $T_{INT,MAX}$ as:

$$T_{INT,MAX} = \frac{1}{f} - G(R) \cdot (T_{CO} + n \cdot T_{BIT} + COF \cdot PCDS \cdot T_{CDS}) \quad (20)$$

The maximum dynamic range expansion factor, K, is set by this maximum required integration time, $T_{INT,MAX}$, and the time it takes to check a row of the pixel array using two consecutive scanner lines, and $T_{INT,MIN}$, the minimum required integration time. This is set, in general, by the fabrication process specifications, and is given as:

$$T_{INT,MIN} = T_{COMP} + p_1 \cdot \tau_C \cdot COL + p_2 \cdot \tau_R \cdot ROW, \quad (21)$$

where $T_{COMP}$ is the propagation delay of the column comparator and all other time requirements of the column controller; COL and ROW are the number of rows and columns of the pixel array; $\tau_C$ is the settling time constant of the signal lines that run horizontally through the pixel array, namely, the Shutter, ResetSelect, ResetPulse, RowSelect, and nColRead signal lines; $\tau_R$ is the settling time constant of the signal lines that run vertically through the pixel array, namely, $COMP_i$ and $OUT_i$, and $p_1$ and $p_2$ are the number of transitions that these lines must make to access a pixel and to reset a pixel if such is found to be necessary.

Based on these considerations, the dynamic range increase factor, K, is given as:

$$K = \frac{\frac{1}{f} - G(R) \cdot (T_{CO} + n \cdot T_{BIT} + COF \cdot PCDS \cdot T_{CDS})}{T_{INT,MIN}}. \quad (22)$$

Expressions (21) and (22) point out that the performance of the imager system can be altered on a frame-by-frame basis. For example, because the maximum required integration time is directly proportional to the dynamic range expansion factor and is inversely proportional to the frame rate, dynamic range can be traded for frame rate. If the dynamic range is a fixed parameter, then the frame rate can be increased by reducing the ADC resolution. For a given dynamic range and ADC resolution, the frame rate can be modified by resizing of the pixel window to reduce spatial resolution by employing fewer pixels in the array.

Figure 22:
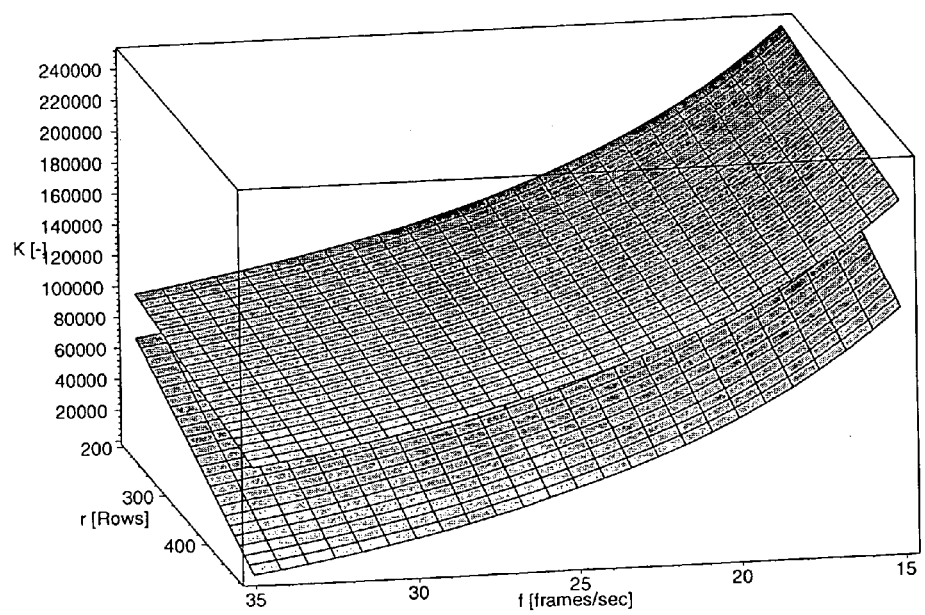
FIG. 22 is a plot of dynamic range expansion factor provided by the invention, as a function of frame rate and number of pixels employed in the pixel array of the imager system, achieved with two consecutive scanner lines, and a shortest integration time slot duration during an integration period of length $T_{INT,MIN}$.

FIG. 22 is a plot of the dynamic range expansion factor, K, given by expression (22) above, as a function of both the number, R, of pixels employed, and the frame rate, f, in 1/sec, for an example where $T_{BIT} = T_{CDS} = 100$ nsec, $T_{INT,MIN} = 250$ nsec, $T_{CO} = 250$ nsec, COF=1, PCDS=2, and $G(R) = \lfloor 640 \cdot R/16 \rfloor$, for a 0.35 μm fabrication process. This provides the maximum possible dynamic range expansion employing the integration control method and imager of the invention, and is achieved with two consecutive scanner lines, resulting in a requirement that the shortest integration time slot duration be of length $T_{INT,MIN}$.

It is found that this technique cannot produce integration slots that are related by small constants; if a double scanner is employed, then the two shortest integration time slot durations are of length $T_{INT,MIN}$ and approximately ROWS·$T_{INT,MIN}$. These two dissimilar slot durations result in a significant bin size increase from one slot to the other, causing visual artifacts. Such artifacts can be minimized by specifying the duration of the shortest integration slot as 2·$T_{INT,MIN}$. This reduces the dynamic range increase, but minimizes artifacts. Here the dynamic range increase factor, K, is given as:

$$K = \frac{\frac{1}{f} - G(R) \cdot (T_{CO} + n \cdot T_{BIT} + COF \cdot PCDS \cdot T_{CDS})}{ROWS \cdot T_{INT,MIN}} \quad (23)$$

Figure 23:
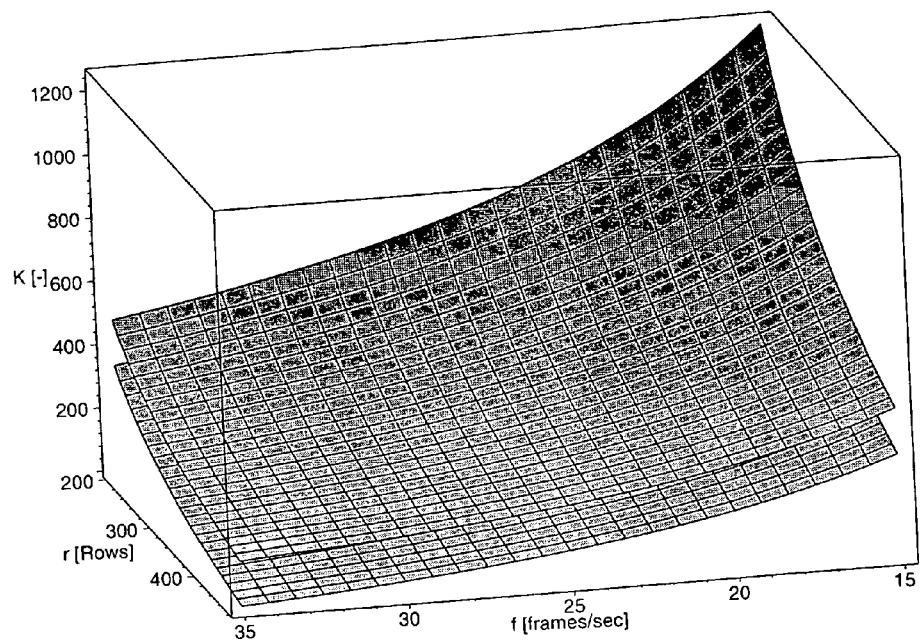
FIG. 23 is a plot of dynamic range expansion factor provided by the invention, as a function of frame rate and number of pixels employed in the pixel array of the imager system, for a shortest integration slot duration of an integration period being of length $2 \cdot T_{INT,MIN}$.

FIG. 23 provides a plot of this expression for the parameter values employed in expression (22) and the plot of FIG. 22. The reduction in dynamic range between the two plots is evident.

Because the integration slots are a discrete set, the dynamic range increase factor cannot take continuous values, and instead, can only take the discrete values of J(0), J(1), ..., J(M). For the example where B is a constant, e.g., B=2, this results in an adjustment of relation (23) above such that the dynamic range increase factor, K, can only take values that are a power of two. This results in an expression for the dynamic range increase factor, K, is given as:

$$K = 2^{\left\lfloor \log_2 \left( \frac{\frac{1}{f} - G(R) \cdot (T_{CO} + n \cdot T_{BIT} + COF \cdot PCDS \cdot T_{CDS})}{ROWS \cdot T_{INT,MIN}} \right) \right\rfloor} \quad (24)$$

Figure 24:
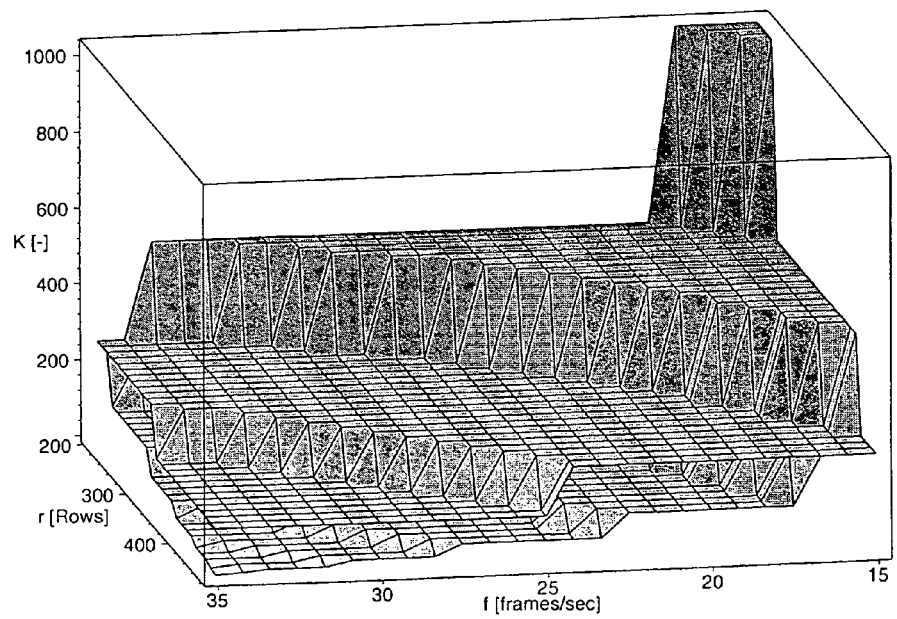
FIG. 24 is a plot of dynamic range expansion factor provided by the invention, as a function of frame rate and number of pixels employed in the pixel array of the imager system, for a condition where the dynamic range increase factor can only take values that are a power of two.

FIG. 24 is a plot of this expression for the parameter values given above in connection with the plot of FIG. 22.

From the plots, it is seen that for low frame rates, the dynamic range expansion constant is very sensitive to the values of R and n, because here the maximum required integration time is approximately inversely proportional to the frame rate. But this insensitivity is lost at higher frame rates. At high frame rates, the lower the ADC precision, the lesser the dependence on the size of the pixel window employed.

With relation (24) above, the various performance parameters can be evaluated. The parameters R, n, f, and K can be ordered from most to least importance for a given application, and then expression (22) above evaluated to validate the least important parameter. If the resulting value of the parameter is within an allowable range set for that parameter by the application or the imager system itself, the selected values are confirmed.

If the parameter is found to not fall within an allowable range of values, then the next to last parameter in the list is altered to determine the least important parameter in its allowable range. This process is repeated until the imager performance is as close as it can be to the desired performance.

The invention contemplates a method for the adaptive determination of an optimal K value for a given application. In one example of such a method, an initial, allowable K value is selected. Then one frame is imaged with the selected K value, and there is produced a frame histogram of digital code versus the number of pixels digitized to the same digital code. If the number of pixels found to have saturated, i.e., having the maximum digital code, is more than a selected threshold, then a next higher available K value is selected. If no pixels in histogram are above the midpoint of the allowable digital code, then the next lowest K value is selected. This process can be iterated over several frames at the start of an imager application operation, to very quickly determine an appropriate K value for the application. The process can then be carried out periodically over the course of an imager application operation, to tune the system as needed.

With this discussion, it is to recognized that both the integration control method and the imager system provided by the invention can be adapted for a wide range of imager applications and configurations, including machine vision and scientific applications such as automotive and astronomy applications, as well as consumer applications such as camcorder and still camera products. Any pixel design that accommodates non-destructive read out of a signal indicative of charge accumulation at the pixel site can be employed. While an example imager employing CMOS pixel technology has been used in the discussion to describe the features of the invention, the invention contemplates alternative pixel technologies and configurations. For example, a voltage-output pixel is not required to enable the integration control method of the invention; electrical current, charge, or other characteristic of pixel charge accumulation can be employed. The expressions described above for setting pixel integration control parameters highlighted this flexibility in their use of the parameter I to refer to a general electrical pixel output.

The particular example implementation of the imager system of the invention described above is not required. For example, the generation of pixel and memory array access and control signals is not required to be carried out by any particular sub-system; the description above provides an example configuration, but others are contemplated. Whatever system configuration is employed, it is preferred that it accommodate a user-interface for enabling real time programming of system parameters.

With this configuration, the imager system of the invention provides the ability to monolithically integrate user-programmable pixel array control with the pixel array itself. This integration minimizes generation of noise in pixel value processing and maximizes imager system signal processing speed. As a result, the single-chip imager system of the invention enables an increase in pixel dynamic range that cannot be achieved by multi-chip imager systems. The maximum dynamic range increase attainable by a multi-chip imager system is severely limited by that system's relatively slow signal speed, due to signal propagation between chips. Generally, the degree to which a multi-chip system limits dynamic range expansion renders the attainable expansion of little value for most applications.

The imager system of the invention eliminates the limitations of multi-chip systems to provide a system that enables a dramatic increase in attainable dynamic range expansion. This superior performance is further enhanced with an integral user interface that enables real time user-programmability of the dynamic range expansion, as well as other operational parameters. In addition, compared with a multi-chip imager system, the single-chip imager system of the invention can be fabricated more cost-effectively and results in a smaller-sized system. Further, the system connections are less complicated and more easily configured than that of a multi-chip system.

It is to be recognized that those skilled in the art may make various modifications and additions to the imager system and the pixel integration control method described above without departing from the spirit and scope of the present contribution to the art. Accordingly, it is to be understood that the protection sought to be afforded hereby should be deemed to extend to the subject matter of the claims and all equivalents thereof fairly within the scope of the invention.

We claim:

1. An imager system provided in a semiconductor substrate comprising:
   a plurality of photosensitive, charge integrating pixels arranged in rows and columns of a pixel array for capturing illumination of a scene to be imaged, each pixel comprising a photogenerated charge accumulation region of the substrate and a sense node at which an electrical signal, indicative of pixel charge accumulation, can be measured without discharging the accumulation region;
   pixel access control circuitry connected to pixel array rows and columns to deliver pixel access signals generated by the access control circuitry for independently accessing a selected pixel in the array;
   an input interface circuit connected to accept a dynamic range specification input for the array pixels;
   integration control circuitry connected to access a selected pixel of the array to read the sense node electrical signal of the selected pixel, and configured to generate pixel-specific integration control signals delivered to the selected pixel, independent of other pixels, based on dynamic range specification input provided by the input interface circuit; and
   an output interface circuit connected to the pixel array to produce output image data based on sense node electrical signals from the pixel array.

2. The imager system of claim 1 wherein the pixel sense node electrical signal comprises a voltage signal.

3. The imager system of claim 1 wherein the charge integrating pixels comprise CMOS pixels.

4. The imager system of claim 1 wherein the pixel-specific integration control signals generated by the integration controller comprise pixel-specific charge accumulation reset signals.

5. The imager system of claim 4 further comprising an array of memory cells, each memory cell corresponding to a specified pixel in the pixel array and connected to store from the integration controller an indication of number of reset occurrences of the specified pixel during a given imager integration period.

6. The imager system of claim 5 wherein the memory cell array is configured spatially separate from the pixel array.

7. The imager system of claim 5 wherein the output interface circuit comprises an image data formatter configured to generate output image data based on sense node electrical signals from the pixel array and corresponding reset occurrence data from the memory cell array.

8. The imager system of claim 5 wherein the integration controller comprises a comparator circuit corresponding to each column of the pixel array, each comparator circuit connected to compare a sense node electrical signal of a pixel selected from the corresponding array column with a reference electrical signal that is generated based on the dynamic range specification input to produce a comparator output signal determinative of reset timing of the selected pixel.

9. The imager system of claim 8 wherein the integration controller is configured to generate integration control signals for a selected pixel based on output signals from a corresponding comparator, to permit integration of the selected pixel during at least one of a plurality of integration slots, the integration slots being of successively shorter durations and all integration slots having a common end time, the integration slot durations defined for a given imager integration period based on the dynamic range specification input.

10. The imager system of claim 9 wherein the plurality of integration slots for a given imager integration period is at least three.

11. The imager system of claim 1 wherein the output interface circuit comprises a correlated double-sampling circuit configured to convert sense node electrical signals from the pixel array from single-ended to differential output and remove pixel reset level from the sense node electrical signals.

12. The imager system of claim 11 wherein the output interface circuit further comprises an analog-to-digital converter configured to digitize sense node electrical signals from the pixel array.

13. The imager system of claim 12 wherein the analog-to-digital converter comprises an array of analog-to-digital converters; and further comprising a multiplexer connected between the pixel array and the analog-to-digital converter array for directing a selected sense node electrical signal from the pixel array to a selected converter in the array of converters.

14. The imager system of claim 1 wherein the input interface circuit is further connected to accept a specification of a sub-array of pixels to be controlled in the pixel array; and wherein the integration control circuitry is connected to independently access a selected pixel in the sub-array of pixels.

15. The imager system of claim 1 wherein the input interface circuit is further connected to accept a specification of a number of pixels to be controlled in the pixel array, and wherein the integration control circuitry is connected to independently access a selected pixel in the number of pixels specified.

16. The imager system of claim 1 wherein the input interface circuit is further connected to accept a specification of a frame rate at which images of a scene are to be produced, and wherein the integration control circuitry is configured to impose on the pixel array an imager integration period based on the frame rate specification.

17. The imager of claim 1 wherein the input interface circuit is further connected to accept a specification of sense node electrical signal digitization resolution, and wherein the output interface circuit comprises an image data formatter configured to generate digitized output image data based on sense node electrical signals and the digitization resolution specification.

18. The imager system of claim 9 wherein the dynamic range specification input accepted by the input interface circuit comprises a specification of a duration ratio between successively started integration slots for a given imager integration period.

19. A method for controlling charge integration of a plurality of photosensitive, charge integrating pixels of a pixel array for capturing illumination of a scene to be imaged during an integration period, each pixel comprising a photogenerated charge accumulation region and a sense node at which an electrical signal, indicative of pixel charge accumulation, can be measured without discharging the accumulation region, the method comprising:
   (A) providing a plurality of integration slots for the integration period, all integration slots ending with integration period end, a first integration slot beginning with integration period start, and each integration slot following the first slot being of successively shorter duration;

(B) initiating charge integration of each pixel in the pixel array for the integration period and the first integration slot;

(C) for any current integration slot except a last integration slot, at an intermediate time during the current integration slot, evaluating the sense node electrical signal of each pixel for which the current integration slot was initiated to determine if that pixel will saturate during the current integration slot, the saturation evaluation based on the electrical signal range characteristic of that pixel and the ratio of duration of a next succeeding integration slot to duration of the current integration slot;

(D) resetting any pixel for which the integration evaluation indicates pixel saturation during the current integration slot;

(E) permitting continued integration to the end of the current integration slot of any pixel for which the integration evaluation does not indicate saturation during the current integration slot, and initiating a next succeeding integration slot for any reset pixel;

(F) repeating steps (C) to (E) until the end of the integration period and the last integration slot is reached; and (G) producing output image data for each pixel based on sense node electrical signals from that pixel and an indication of number of integration slots for which that pixel was initiated during the integration period.

20. The method of claim 19 wherein the pixel saturation evaluation comprises a comparison of pixel sense node voltage to a check voltage, $V_{CHECK(i)}$, for the $i^{th}$ integration slot, given as:

$$V_{CHECK(i)} = V_{RESET} - \Delta V_D \cdot \left(1 - \frac{T_{INT(i+1)}}{T_{INT(i)}}\right),$$

for electron integration and $$V_{CHECK(i)} = V_{RESET} + \Delta V_D \cdot \left(1 - \frac{T_{INT(i+1)}}{T_{INT(i)}}\right),$$

for hole integration, where $V_{RESET}$ is a characteristic pixel reset voltage, $\Delta V_D$ is a voltage range characteristic of the pixel, $T_{INT(i+1)}$ is the duration of the next succeeding integration slot, and $T_{INT(i)}$ is the duration of the current integration slot.

21. The method of claim 19 further comprising updating data stored in an array of memory cells that are provided in a one-to-one correspondence with the array of pixels, memory cell data reflecting a number of times for which a corresponding pixel was reset during the integration period; and wherein the indication of number of integration slots for which a pixel was initiated during the integration period comprises corresponding memory cell data.

22. The method of claim 19 wherein the plurality of integration slots provided for the integration period comprises at least three integration slots.

23. The method of claim 19 wherein the plurality of integration slots provided for the integration period comprise a first integration slot of maximum duration, $T_{INT,MAX}$, and a last integration slot of minimum duration, $T_{INT,MIN}$, which are determined based on an input dynamic range increase specification, K, as $$K = \frac{T_{INT,MAX}}{T_{INT,MIN}}.$$

* * * * *